United States Patent
Armstrong et al.

[11] Patent Number: 6,086,055
[45] Date of Patent: Jul. 11, 2000

[54] COMBINED VAPOR/LIQUID DISTRIBUTOR FOR PACKED COLUMNS

[75] Inventors: Phillip Andrew Armstrong, Orefield; Kenneth William Kovak, Macungie; James William Meehan, Shavertown, all of Pa.

[73] Assignee: Air Products and Chemicals, Inc., Allentown, Pa.

[21] Appl. No.: 09/166,374

[22] Filed: Oct. 5, 1998

[51] Int. Cl.⁷ ..................................................... B01F 3/04
[52] U.S. Cl. ................... 261/96; 261/97; 62/171
[58] Field of Search ............... 261/97, 96, 110, 261/109; 422/220; 62/171

[56] References Cited

U.S. PATENT DOCUMENTS

| | | | |
|---|---|---|---|
| 2,394,133 | 2/1946 | Zimmerman | 261/110 |
| 3,502,445 | 3/1970 | Ballard et al. | 261/97 |
| 4,087,252 | 5/1978 | Strahorn et al. | 261/97 |
| 5,132,055 | 7/1992 | Alleaume et al. | 261/97 |
| 5,224,351 | 7/1993 | Jeannot et al. | 62/36 |
| 5,240,652 | 8/1993 | Taylor et al. | 261/97 |
| 5,244,604 | 9/1993 | Miller et al. | |
| 5,645,770 | 7/1997 | McNulty et al. | 261/97 |

FOREIGN PATENT DOCUMENTS

| | | |
|---|---|---|
| 2173280 | 10/1996 | Canada . |
| 0664144A2 | 7/1995 | European Pat. Off. . |
| 0782877A1 | 7/1997 | European Pat. Off. . |

Primary Examiner—David A. Simmons
Assistant Examiner—Robert A. Hopkins
Attorney, Agent, or Firm—Willard Jones, II

[57] ABSTRACT

A combined liquid/vapor distributor and method of assembly are disclosed together with a method for collection and distribution of a liquid and a vapor in an exchange column. The combined liquid/vapor distributor is an apparatus for distributing a liquid and a vapor to or from a packing in an exchange column. The apparatus includes a distributor and a deck above and adjacent the distributor. The distributor has at least one vapor riser, which has generally parallel spaced apart upright walls and an open top and an open bottom opposite the open top. The distributor also has at least one liquid trough adjacent the vapor riser. The liquid trough has an open top and a floor having at least one aperture. The floor is opposite the open top of the liquid trough and is attached to at least one wall of the adjacent vapor riser. The deck has a top and a bottom and at least one aperture vertically aligned with the open top of the vapor riser and at least one aperture vertically aligned with the open top of the liquid trough. The distributor is mounted on a support grate.

27 Claims, 13 Drawing Sheets

COMBINED VAPOR/LIQUID DISTRIBUTOR FOR PACKED COLUMNS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to an apparatus for distributing a liquid and a vapor to or from a packing in an exchange column for heat and/or mass transfer processes. The apparatus has particular application in cryogenic air separation processes utilizing distillation, although it may be used in other heat and/or mass transfer processes that use packing (e.g., random or structured packing).

The term, "column", as used herein, means a distillation or fractionation column or zone, i.e., a column or zone wherein liquid and vapor phases are countercurrently contacted to effect separation of a fluid mixture, such as by contacting of the vapor and liquid phases on packing elements or on a series of vertically-spaced trays or plates mounted within the column.

The term "packing" means solid or hollow bodies of predetermined size, shape, and configuration used as column internals to provide surface area for the liquid to allow mass transfer at the liquid-vapor interface during countercurrent flow of two phases. Two broad classes of packings are "random" and "structured".

"Random packing" means packing wherein individual members do not have any particular orientation relative to each other or to the column axis. Random packings are small, hollow structures with large surface area per unit volume that are loaded at random into a column.

"Structured packing" means packing wherein individual members have specific orientation relative to each other and to the column axis. Structured packings usually are made of expanded metal or woven wire screen stacked in layers or as spiral windings; however, other materials of construction, such as plain sheet metal, may be used.

Cryogenic separation of air is carried out by passing liquid and vapor in countercurrent contact through a distillation column. A vapor phase of the mixture ascends with an ever increasing concentration of the more volatile components (e.g., nitrogen) while a liquid phase of the mixture descends with an ever increasing concentration of the less volatile components (e.g., oxygen). Various packings or trays may be used to bring the liquid and gaseous phases of the mixture into contact to accomplish mass transfer between the phases.

The use of packing for distillation is standard practice and has many advantages where pressure drop is important. However, packed column performance is very dependent on creating and maintaining a balance between the downward flow of liquid and the upward flow of vapor locally in the packing. The distribution of the liquid and the vapor within the packing is influenced by the initial presentation of these fluids to the packing.

Initial presentation of liquid and vapor to the packing is usually made by means of distributors. A liquid distributor, the role of which is to irrigate the packing uniformly with liquid, is located above the packing, while a vapor distributor, the role of which is to create uniform vapor flow below the packing, is located below the packing.

In practice, packed distillation columns can be separated into two or more packed sections. The number of packed sections depends on the particular separation being carried out. For example, each section may have a unique gross ratio of the molar flow of liquid and vapor ("L/V ratio") to perform the distillation most efficiently. In this case, liquid and/or vapor may be transported to or from another column, tank, or heat exchanger and withdrawn or fed above and below each packed section. Another required use of separate packed sections arises when the packed section height approaches some maximum value, above which it is necessary to collect and/or redistribute the two fluids before continuing the separation. The redistribution of the fluids acts to mitigate the effects of maldistribution. In this case, a single tall section, for example, would be divided into two or more shorter sections, each with substantially the same gross L/V ratio.

The use of a multiplicity of separate packed sections in a column requires a multiplicity of liquid and vapor distributors above and below each section. Adjacent distributors typically work in tandem; that is, the vapor distributor distributes vapor while also collecting liquid from the section above and passing it to the liquid distributor below. Feeds and draws of liquid and/or vapor between the packed sections are made in connection with the distributors as well. For example, a feed of liquid may be made through the side of the column, directly into the liquid distributor which simultaneously receives liquid collected by the vapor distributor above.

Besides the role of gross flow distribution, distributors located between packed sections also can mitigate the effects of gross concentration gradients in a column. The mixing of liquid in the vapor and liquid distributors collected from different radial locations in the packed section above reduces any composition differences across the column cross-section. The liquid distributor may also mix liquids fed to the column from a sidefeed with liquids collected from the section above. The vapor distributor can act in a similar way to mix vapors across the column cross-section and to mix vapor introduced from outside the column with the predominant upward-flowing vapor in the column.

Offsetting the advantages afforded by liquid and vapor distributors to column performance, each distributor also adds significant height to the column. The vertical distance between the bottom of a packed section and the top of an adjacent packed section below it must be large enough to accommodate the vapor distributor, the liquid distributor, and any feed-nozzles or draw-nozzles. Vertical distance is needed below the liquid distributor and above the vapor distributor to give the vapor flow sufficient disengagement space so as not to affect flow uniformity in the packing. Some additional vertical distance may be necessitated by the requirements of installing the individual distributor components and nozzles into the column.

In addition to the cost of column height, each distributor also incurs a fabrication cost. Besides the height requirements and fabrication costs of vapor and liquid distributors, their close proximity also adds complexity and cost to column design.

For example, the vapor distributor must be designed with regard to the orientation, geometry, and proximity of the liquid distributor and the feed/draw nozzles to avoid severe vapor maldistribution from the "shadowing effect" of these components on the vapor flow. There is an added vertical distance requirement which arises from locating the distributors adjacent to each other. Vertical distance is needed between the liquid distributor and the vapor distributor for additional disengagement space necessitated by vapor flow nonuniformity caused by the liquid distributor before the vapor passes into the vapor distributor.

Thus, optimum packed column liquid and vapor distribution systems effectively distribute both liquids and vapors with minimum column height requirements and fabrication costs while promoting adequate mixing of the individual fluids.

There are three main types of typical liquid distributors—pipe, pan, and trough distributors. Each type is discussed briefly below.

Pipe distributors are comprised of an interconnecting network of closed pipes or ducts, typically comprising a central pipe or manifold and a number of arms or branches radiating from the central pipe. The arms are perforated to allow the liquid passing from the central pipe and into the arms to be dripped or sprayed onto a packed bed below the pipe distributor. Upwardly flowing vapor passes easily in-between each arm. Pipe distributors receive liquid from a separate liquid collector or an external source piped through the wall of the column. While simple and inexpensive to construct, pipe distributors may distribute liquid poorly when vapor gets trapped in the arms.

Pan distributors are comprised of a pan or pot, having holes in the bottom for feeding liquid to the packing below, and tubes or risers for the vapor to pass upwardly through the distributor. Pan distributors often make a complete seal with the wall of a column. Thus, pan distributors can act as liquid collectors as well as distributors. However, since large pan distributors are costly to build, pan distributors usually are used in smaller columns, i.e., columns with diameters less than 1.5 meters.

Trough distributors comprise a collection of interconnecting open troughs having irrigation holes in the base to feed liquid to the packing below. One or more upper collection troughs, or a simple pot on top of the lower troughs feeds liquid to the lower troughs through a series or holes or overflowing notches. Vapor from the packing below passes upward between the liquid-containing troughs.

Initial presentation of vapor is made by a vapor distributor, which typically comprises a device which imparts a flow restriction on the vapor, such as a perforated tray or series of small diameter "chimneys" mounted on a flat plate which is otherwise sealed to vapor flow. The flow restriction causes a pressure drop in the vapor as it passes through the device. The imposed pressure drop is made to exceed any radial pressure gradients which are likely to exist within the vapor phase, and thereby forces vapor-flow-rate uniformity across the cross-section of the column.

Attempts have been made to reduce the column height between two packed sections by combining two or more of the following—liquid collection, liquid distribution, and vapor distribution—into one or two pieces of equipment. These fall into two categories: 1) combined liquid collectors/liquid distributors; and 2) combined liquid collectors/liquid distributors/vapor distributors. (It is noted that the typical vapor distributor, comprising a perforated tray and a downcomer(s), also acts as a liquid collector.)

A pan-type liquid distributor can act as a liquid collector below a packed section as previously mentioned, provided that the vapor risers are shielded from the liquid dripping down from the packing above. Ways have been suggested by which trough distributors can act as liquid collectors/distributors by shielding vapor risers. These are a type of re-distributor, because they typically do not accept a liquid feed.

Variations on the combined liquid collector/distributor have been proposed. For example, in one design, a series of troughs is placed at two or more elevations, so that the upper layer of troughs is staggered with respect to the lower series of troughs, thus forming a tortuous path for the vapor and attempting to collect all the liquid raining down from the packing above. A wall seal is made by a special deflector sheet at each elevation.

In another design, a series of nested, truncated funnels placed over a trough-type liquid distributor act as a liquid collector. Gaps between each funnel allow vapor to pass upward between the funnels. The diameter of the top of each funnel is larger than the bottom of the adjacent funnel, so that the liquid coming from the packing above is collected.

In yet another design, a series of strips placed over vapor risers deflect liquid raining down onto a trough-type liquid distributor. This design can be used in conjunction with a liquid feed nozzle whose perforations are located over the strips, so that the feed liquid can be mixed with the liquid raining down on the strips as it spills into the troughs.

Attempts at promoting liquid mixing within distributors by various means have been suggested in the prior art. In U.S. Pat. No. 5,240,652, a pan-type distributor with capped risers acts as a liquid collector and feeds liquid to a central trough, which then distributes the liquid to a lower pan distributor. The central trough acts as a predistributor for the lower pan distributor and also mixes the liquid collected on the liquid collector. This type of distributor has several disadvantages, including the fact that the liquid collection and pre-distribution functions are performed at two elevations. Also, this type of distributor does not provide for liquid or vapor feeds and/or draws.

In European Patent No. EP0782877A1, a baffle is placed inside a pan re-distributor to promote mixing within the liquid reservoir by forcing the liquid to follow a tortuous path inside the distributor.

Perhaps the most significant attempts at combining distributor functions are disclosed in Canadian Patent No. 2,173,280 and U.S. Pat. Nos. 5,132,055 and 5,224,351 (and its equivalent, European Patent No. EP0644144A2). These patents disclose combined distributors which act as liquid collector/distributors, vapor distributors, and structured packing support structures. Variations accept liquid and vapor feeds and draws, perform internal liquid mixing, and act as transition elements between column sections of different diameters. The basic unit of the disclosed combined distributor is a trough distributor having vapor risers formed from inverted U-shaped elements which have narrow slots located on the sloping portion of the riser for vapor to pass through. The packing rests on the top of the inverted U-shaped risers.

There are several disadvantages with those and other prior art distributors. For example, the distributors do not reduce any concentration gradients that may have developed across the column in the vapor phase. The distributors also are susceptible to malperformance caused by gross liquid maldistribution in the packed section above the distributor. In some of the designs, the troughs receive liquid directly from the packing above. Any non-uniformity in the received liquid flux must be dampened by hydrodynamic resistance of the orifices in the bottom of the troughs; dampening is accomplished primarily by decreasing the number and/or area of the orifices in the bottom of the troughs to increase the liquid level in the troughs, so that the liquid level variations in the troughs caused by flux non-uniformity are small relative to the total liquid head in the troughs. Increased liquid level requires increased trough height, which, in turn, requires increased column height. At very high levels of liquid maldistribution, the additional column height required to achieve a liquid level in the troughs adequate to dampen the flux non-uniformity becomes excessive.

The prior art designs which utilize baffles, such as European Patent No. EP0782877A1, impose an added hydrodynamic resistance to liquid migration within the troughs, and therefore negatively affect the distribution when liquid maldistribution is present in the packed section above the combined distributor.

It is desired to have a combined vapor/liquid distributor for packed columns which affords better liquid and vapor mixing than the prior art liquid distributors and vapor distributors, and which also overcomes many of the difficulties and disadvantages of the prior art to provide better and more advantageous results.

It is further desired to have an optimum combined vapor/liquid distributor which effectively distributes both liquids and vapors with minimum column height requirements and fabrication costs while promoting adequate mixing of the liquids and vapors.

It is still further desired to have a combined vapor/liquid distributor for packed columns which provides for liquid and/or vapor feeds and/or draws.

It is still further desired to reduce cross-column concentration gradients.

It is still further desired to decrease the likelihood of malperformance caused by gross liquid maldistribution in packed columns by mitigating the effects of liquid maldistribution.

It is still further desired to have a combined vapor/liquid distributor which performs both liquid collection and pre-distribution functions at a single elevation within the column, and which also distributes vapor and provides the option for liquid and/or vapor feeds and/or draws.

It is still further desired to have a combined vapor/liquid distributor that shows high performance characteristics for cryogenic applications, such as those used in air separation, and for other heat and/or mass transfer applications.

It is still further desired to have an optimal design of a combined vapor/liquid distributor that operates in an optimal manner and minimizes its size, weight and/or cost, which will result in an air separation process more efficient and/or less expensive per unit quantity of product produced.

It is still further desired to have a more efficient air separation process utilizing a combined vapor/liquid distributor which is more compact and more efficient than the prior art.

It also is further desired to have a method of assembling a combined vapor/liquid distributor for exchange columns which affords better liquid and vapor mixing than the prior art liquid distributors and vapor distributors, and which also overcomes many of the difficulties and disadvantages of the prior art to provide better and more advantageous results.

It also is further desired to have a new, more efficient method for the collection and distribution of a liquid and a vapor in exchange columns.

BRIEF SUMMARY OF THE INVENTION

The present invention is a combined vapor/liquid distributor ("combined distributor") for distributing a liquid and a vapor to or from a packing in an exchange column for heat and/or mass transfer processes. In addition to the apparatus for distributing the liquid and vapor, the invention also includes methods for assembling the different embodiments of the combined distributor in an exchange column and methods for the collection and distribution of a liquid and a vapor in an exchange column.

In a first embodiment, the apparatus for distributing a liquid and a vapor to or from a packing in an exchange column includes a distributor and a deck. The distributor has at least one vapor riser, which has generally parallel spaced apart upright walls and an open top and open bottom opposite the open top. The distributor also has at least one liquid trough adjacent the vapor riser. The liquid trough has an open top and a floor having at least one aperture, and the floor is opposite the open top of the liquid trough and is attached to at least one wall of the adjacent vapor riser. The deck has a top and a bottom above and adjacent the distributor. The deck has at least one aperture vertically aligned with the open top of the vapor riser and at least one aperture vertically aligned with the open top of the liquid trough.

In a second embodiment, the apparatus also includes at least one canted flume above and adjacent the top of the deck. The canted flume is adapted for directing the liquid from a packing onto the top of the deck.

A third embodiment of the apparatus is similar to the first embodiment, except that at least one of the vapor risers has a perforated cap mounted on top of the vapor riser and there is no deck. In one variation of this embodiment, the apparatus also includes at least one canted flume above and adjacent the open top of the liquid trough. The canted flume is adapted for directing the liquid from a packing to the open top of the liquid trough.

In all of the embodiments, the distributor may be mounted on a support grate.

In a fourth embodiment, the apparatus also includes a liquid draw nozzle disposed inside the distributor.

In a fifth embodiment, the apparatus includes a vapor draw nozzle disposed inside the distributor.

In a sixth embodiment, the apparatus includes a liquid feed nozzle disposed inside the distributor.

In a seventh embodiment, the apparatus includes a vapor feed nozzle disposed inside the distributor.

An eighth embodiment of the apparatus is similar to the seventh embodiment, but includes at least one passageway adapted for transmitting a vapor feed from the vapor feed nozzle to the bottom of the deck, and the deck has at least one aperture in communication with the at least one passageway.

A ninth embodiment is similar to the seventh embodiment, but includes at least one connecting duct disposed between adjacent liquid troughs below the vapor feed nozzle.

A tenth embodiment is similar to the seventh embodiment, but includes at least one baffle disposed in the distributor, and the vapor feed nozzle is truncated.

An eleventh embodiment is similar to the first embodiment, but includes a two-phase feed nozzle disposed inside the distributor.

A twelfth embodiment is similar to the eleventh embodiment with some variations. The two-phase feed nozzle comprises a central manifold and at least one projecting tube adapted for transmitting vented vapor from the central manifold. The projecting tube has one end in communication with the central manifold and another open end above the top of the deck.

A thirteenth embodiment is similar to the twelfth embodiment, but includes several additional elements. The first additional element is at least one pipe having an open end in communication with the central manifold, the pipe being adapted for transmitting vented vapor radially from the central manifold. The second additional element is at least one projecting tube adapted for transmitting vented vapor from the pipe, the projecting tube having one open end in communication with the pipe and another open end above the top of the deck.

A fourteenth embodiment is similar to the first embodiment, but includes a vapor draw nozzle disposed inside the distributor and a liquid feed nozzle disposed inside the distributor.

In all of the embodiments, the total surface area of the apertures in the deck may vary. The total surface area of the apertures in the deck is in the range of 0% to 100% of the total surface area of the deck.

Another aspect of the present invention is an exchange column for exchanging heat and/or mass between a liquid and a vapor, the exchange column having at least one apparatus for distributing the liquid and the vapor to or from a packing according to the present invention, as described in the embodiments discussed above.

In another aspect of the present invention, there is provided a process for a cryogenic air separation comprising contacting vapor and liquid counter-currently in at least one distillation column containing at least one mass transfer zone wherein liquid/vapor contact is established by at least one packing wherein a liquid and a vapor are distributed to or from the packing by an apparatus distributing a liquid and a vapor to or from a packing, as described in the embodiments discussed above.

The present invention includes various embodiments of methods for assembling a combined liquid/vapor distributor for distributing a liquid and a vapor to or from a packing in an exchange column. In one embodiment the method for assembling comprises the following steps. The first step is to provide an exchange column. The next step is to provide a distributor. The distributor has: at least one vapor riser, the vapor riser having generally parallel spaced apart upright walls and an open top and an open bottom opposite the open top; and at least one liquid trough adjacent the vapor riser, the liquid trough having an open top and a floor having at least one aperture, the floor being opposite the open top of the liquid trough and attached to at least one wall of the adjacent vapor riser. The next step is to provide a deck having a top and a bottom above and adjacent the distributor, the deck having at least one aperture vertically aligned with the open top of the vapor riser and at least one aperture vertically aligned with the open top of the liquid trough. The final step is to install the distributor in the exchange column.

Another embodiment of the method for assembling is identical to the embodiment of the method described above, but includes two additional steps. The first additional step is to provide at least one canted flume adapted for directing the liquid from a packing onto the top of the deck. The second additional step is to install the at least one canted flume above and adjacent the top of the deck in the exchange column.

Yet another embodiment of the method for assembling comprises the following steps. The first step is to provide an exchange column. The next step is to provide a distributor. The distributor has: at least one vapor riser, the vapor riser having generally parallel spaced apart upright walls and an open top and an open bottom opposite the open top; and at least one liquid trough adjacent the vapor riser, the liquid trough having an open top and a floor having at least one aperture, the floor being opposite the open top of the liquid trough and attached to at least one wall of the adjacent vapor riser. The next step is to provide at least one perforated cap. The next step is to install the distributor in the exchange column. The final step is to mount the perforated cap on the top of at least one of the vapor risers. (Alternatively, the perforated cap may be mounted on top of at least one of the vapor risers before the distributor is installed in the exchange column, so that the distributor with the perforated cap may be installed together in the exchange column.)

Yet another embodiment of the method for assembling is identical to the embodiment of the method described above but includes two additional steps. The first additional step is to provide at least one canted flume adapted for directing the liquid from a packing to the open top of the liquid trough. The second additional step is to install the at least one canted flume above and adjacent the open top of the liquid trough.

The present invention also includes methods for the collection and distribution of a liquid and a vapor in an exchange column. In one embodiment, the method comprises the following steps. The first step is to introduce the liquid into an upper portion of the exchange column. The next step is to introduce the vapor into a lower portion of the exchange column. The next step is to position within the exchange column two vertically spaced apart upper and lower mass or heat transfer sections to define a space in the column between the sections. The next step is to position a combined distributor means to receive a downwardly flowing stream of liquid and an upperwardly flowing stream of vapor in the space in the column. The combined distributor means includes a distributor and a deck. The distributor has at least one vapor riser, which has generally parallel spaced apart upright walls and an open top and an open bottom opposite the open top. The distributor also has at least one liquid trough adjacent the vapor riser. The liquid trough has an open top and a floor having at least one aperture, and the floor is opposite the open top of the liquid trough and is attached to at least one wall of the adjacent vapor riser. The deck has a top and a bottom above and adjacent the distributor. The deck has at least one aperture vertically aligned with the open top of the vapor riser and at least one aperture vertically aligned with the open top of the liquid trough. The next step is to collect the downwardly flowing stream of liquid from the upper portion of the column onto an upper surface of the top of the deck. The next step is to pass the upwardly flowing stream of vapor from the lower portion of the column to the open top of each vapor riser. The next step is to distribute the downwardly flowing stream of liquid from the at least one aperture in the floor of the liquid trough to the lower portion of the column. The final step is to distribute the upwardly flowing stream of vapor from the at least one aperture vertically aligned with the open top of each vapor riser to the upper portion of the column.

Another embodiment of the method for the collection and distribution of a liquid and a vapor in an exchange column is similar to the embodiment of the method described above with one variation. In this alternative embodiment, the distributor includes at least one canted flume above and adjacent the top of the deck. The canted flume is adapted for directing the liquid stream from a packing onto the top of the deck. Instead of collecting the downwardly flowing stream of liquid from the upper portion of the column onto an upper surface of the top of the deck, the stream is collected onto the at least one canted flume, which directs the liquid stream onto the top of the deck.

Yet another embodiment of the method for the collection and distribution of a liquid and vapor in an exchange column comprises the following steps. The first step is to introduce the liquid into an upper portion of the exchange column. The next step is to introduce the vapor into a lower portion of the exchange column. The next step is to position within the exchange column two vertically spaced apart upper and lower mass or heat transfer sections to define a space in the column between the sections. The next step is to position a combined distributor means to receive a downwardly flowing stream of liquid and an upwardly flowing stream of vapor in the space in the column. In this embodiment, the combined distributor means does not include a deck. Rather, it includes at least one vapor riser, the vapor riser having generally parallel spaced apart upright walls and an open top and an open bottom opposite the open top, wherein at least one of the vapor risers has a perforated cap mounted on the top of the vapor riser. It also includes at least one liquid trough adjacent the vapor riser, the liquid trough having an open top and a floor having at least one aperture, the floor being opposite the open top of the liquid trough and attached to at least one wall of the adjacent vapor riser. The next step is to collect the downwardly flowing stream of liquid from the upper portion of the column onto the perforated cap. The next step is to pass the upwardly flowing stream of vapor from the lower portion of the column to the open bottom of each vapor riser. The next step is to distribute the downwardly flowing stream of liquid from the at least one aperture in the floor of the liquid trough to the lower portion of the column. The final step is to distribute the upwardly flowing stream of vapor from the perforated cap to the upper portion of the column.

Yet another embodiment of the method for the collection and distribution of a liquid and a vapor in an exchange is similar to the embodiment of the method described above with one variation. In this alternate embodiment, the combined distributor means also includes at least one canted flume above and adjacent the open top of the liquid trough. The canted flume is adapted for directing the liquid from a packing to the open top of the liquid trough. Rather than collecting the downwardly flowing stream of liquid from the upper portion of the column onto the perforated cap (as in the previous embodiment), that stream is collected from the upper portion of the column onto the at least one canted flume, which directs the liquid stream onto the perforated cap.

BRIEF DESCRIPTION OF SEVERAL VIEWS OF THE DRAWINGS

Embodiments of the Invention will now be described by way of example with reference to the accompanying drawings, in which.

DETAILED DESCRIPTION OF THE INVENTION

The present invention is a combined vapor/liquid distributor ("combined distributor") 20 located above or below a packed section in an exchange column ("column"). The following embodiments and variants are described below: 1) Combined Distributor Without Vapor or Liquid Feeds or Draws, 2) Combined Distributor With Liquid or Vapor Draw, 3) Combined Distributor With Liquid or Vapor Feed, 4) Combined Distributor With Two-phase Feed, 5) Combined Distributor With Multiple Feeds and/or Draws, and 6) Combined Distributor With Conventional Feeds and/or Draws.

Combined Distributor Without Vapor or Liquid Feeds or Draws

Figure 1:
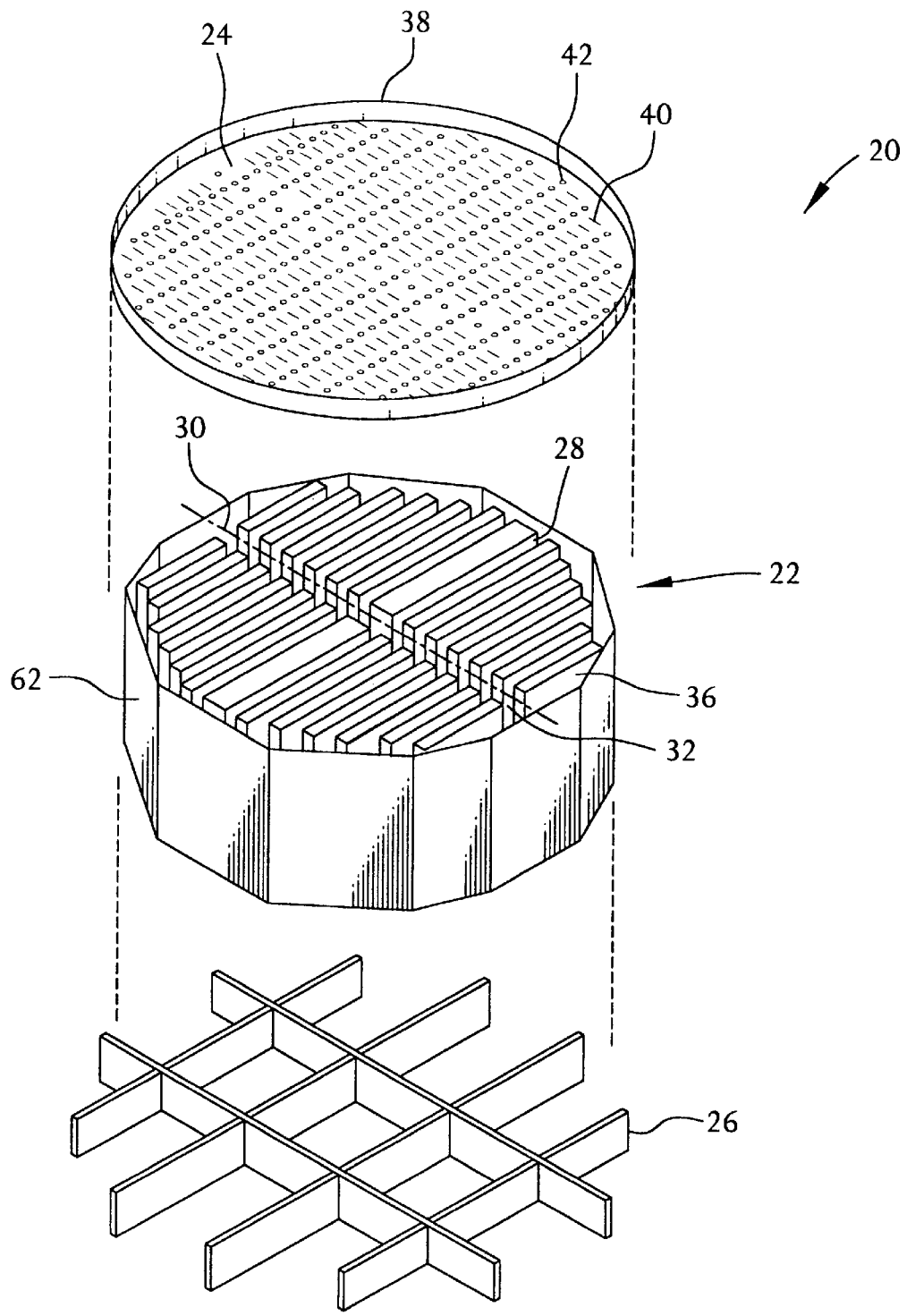
FIG. 1 is an exploded perspective view of one embodiment of the invention (without vapor or liquid feeds or draws)

The combined distributor 20 shown in FIG. 1 includes a distributor 22, a perforated deck 24, and a support grate 26. The distributor 22 includes liquid troughs 28 connected at a peripheral gutter 30 and one or more channels 32 which run perpendicular to the direction of the liquid troughs. The distributor has a wall 62 and is supported on a support grate 26. The liquid troughs have a floor (not shown) with holes or apertures through which liquid flows to the packing below (not shown). Between each liquid trough are vapor risers 36 through which ascending vapor passes. (The liquid troughs may be referred to simply as troughs, and the vapor risers may be referred to simply as risers.)

The risers 36 and troughs 28 share common generally parallel spaced apart upright walls. The floor of each trough is a generally planar surface attached by welding or other means to the upright walls to form a ⊔-shaped trough having an open top opposite the floor. (Alternately, the upright walls and floor may be formed from one piece.) In the preferred embodiment, each riser has an open top and an open bottom opposite the open top.

A perforated deck 24 ("deck") is located on top of the risers 36 and troughs 28, so that the deck makes a seal along the top edges of the troughs. The sides of the perforated deck are bent upward to make a sidewall 38 running around the periphery of the distributor 22. There are two groups of perforations or apertures (e.g., holes) in the perforated deck: 1) perforations 40 located above the risers 36 for vapor to pass upward through, and 2) perforations 42 located above the troughs 28 for the liquid to pass downward through. The perforations 40 for the vapor add pressure drop sufficient to reduce significantly any radial pressure/velocity gradients which might exist in the exchange column (not shown). The perforations 42 for liquid restrict the liquid flow to the troughs 28, so that a small liquid head is maintained on the perforated deck 24, which adds to the pressure drop imposed on the upward flowing vapor and which ensures better mixing within the liquid and contact between the two phases. The perforations 42 for the liquid also can act as a filter for any debris that might otherwise block the holes in the bottom (not shown) of each trough 28. The perforations (40, 42) can take any form of hole or aperture, such as slots, piercings, or specially shaped apertures.

Figure 2:
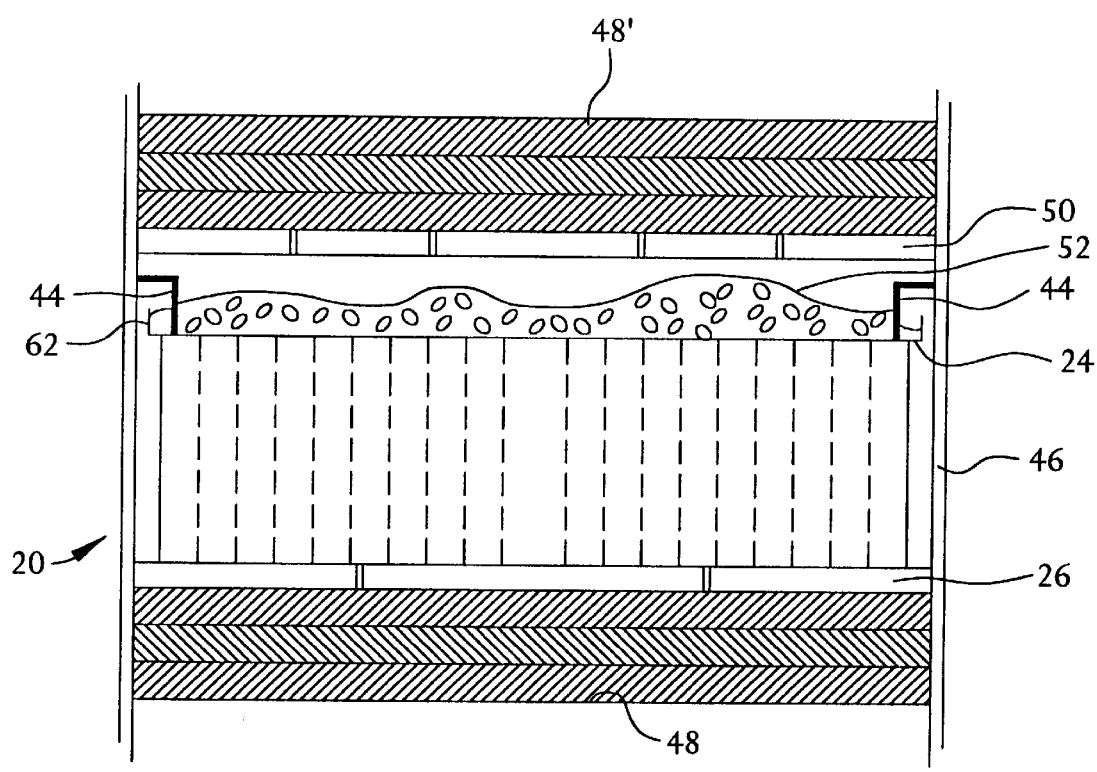
FIG. 2 is a side view of a combined liquid/vapor distributor (without vapor or liquid feeds or draws) in a packed column, including a schematic view of an extension which attaches to and makes a complete seal with the column wall.

The troughs 28 are used as the primary means of liquid distribution, while the perforations 40 in the deck 24 are the primary means of vapor distribution. The perforated deck 24 also acts as a liquid collector, in that it catches the liquid which drips down from the packed section above (not shown). The peripheral sidewall 38 on the deck 24 can be welded to the column (not shown) to catch liquid flowing on the column wall (not shown) and to act as a barrier to vapor flow around the distributor 22. Alternatively and preferably, as shown in FIG. 2, an extension 44 attached to and making a complete seal with the column wall 46 is projected onto the top of the perforated deck 24 so that the liquid level on the perforated deck during operation is above the bottom of the extension. The extension makes close contact with the deck to create an effective seal against vapor by-pass around the outside of the combined distributor 20.

The combined distributor 20 also acts as a mixer of the individual fluid phases, which otherwise reduces cross-sectional concentration gradients. In operation, the vapor ascending from the packing 48 below the combined distributor, as shown in FIG. 2, passes through the risers 36 and the perforations in the deck 24 and bubbles up through the liquid collected on top of the deck from the packing 48' on packing support grate 50 above the combined distributor. A two-phase froth 52 on the perforated deck results from the counter-current flow of the two fluids (i.e., the vapor and the liquid) similar to that on a conventional distillation tray, so that some distillation will be carried out on the perforated deck. The strong physical mixing of each individual phase in the froth contributes to a reduction of concentration gradients in both phases (i.e., the vapor phase and the liquid phase).

Figure 3A:
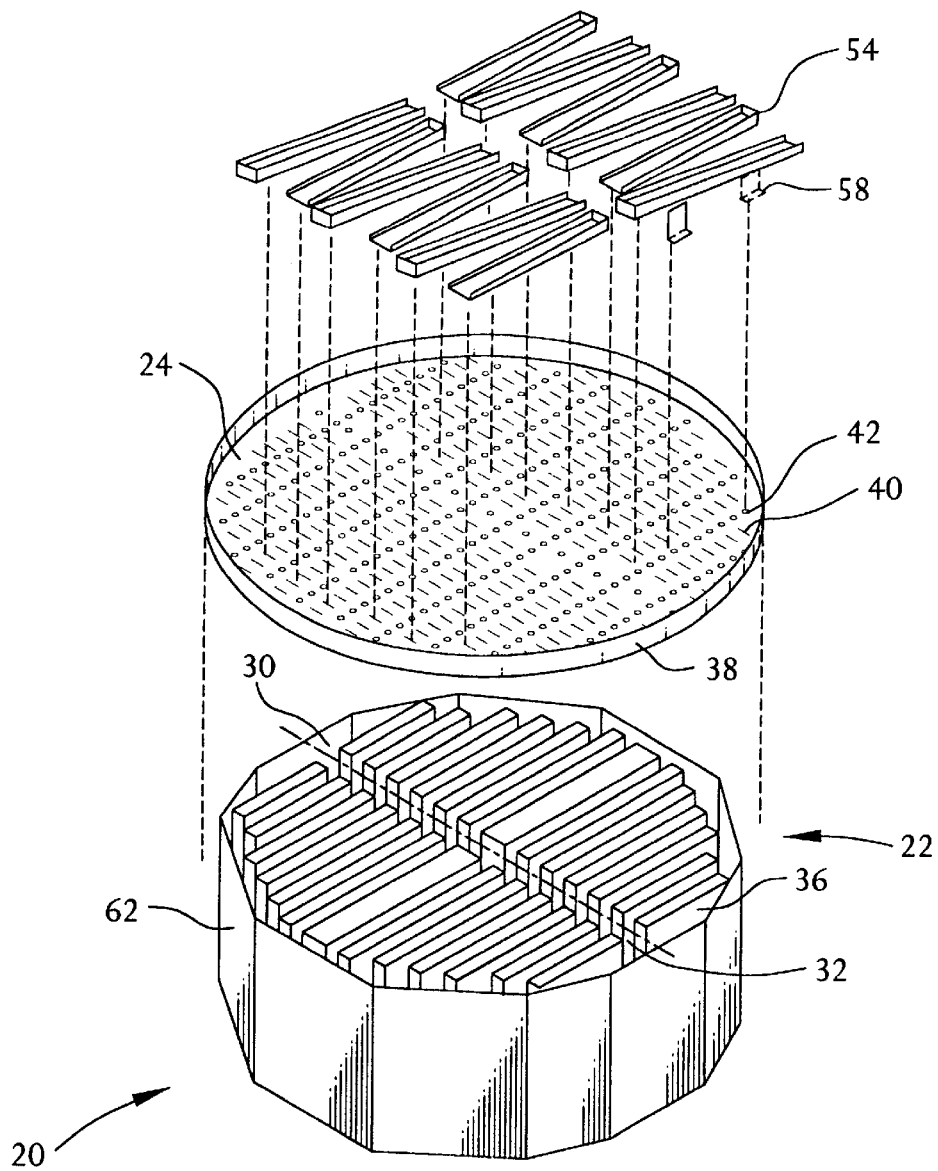
FIG. 3A is an exploded perspective view of another embodiment of the invention which includes canted flumes (support grate not shown)
Figure 3B:
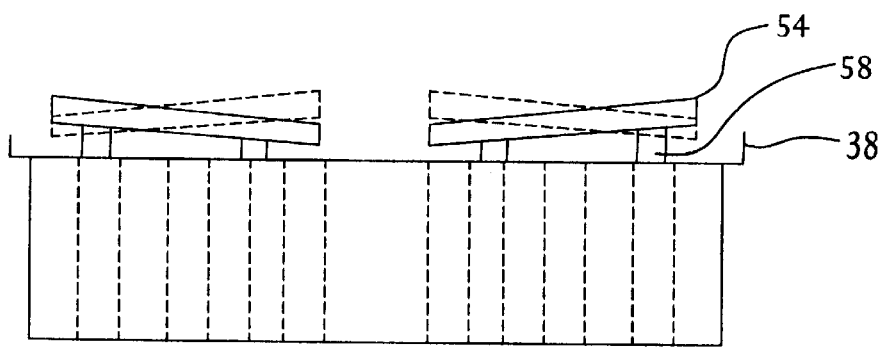
FIG. 3B is a side view of the embodiment illustrated in FIG. 3A.

To further enhance mixing in the liquid phase, the perforated deck 24 can be fitted with canted flumes 54 as shown in FIGS. 3A and 3B. The flumes, which may be attached to the deck by supports 58, are located over the perforations 42 which feed liquid to the troughs 28. The canted flumes collect the liquid dripping down from one area under a packed section (not shown) and direct the liquid onto the perforated deck 24 in another area of the column (not shown). By moving the liquid from different parts of the column above the perforated deck, mixing of liquid across the column is achieved more readily on the perforated deck. The flumes are located in such a way that do not influence the flow of vapor upward or the froth created on the perforated deck.

Figure 1A:
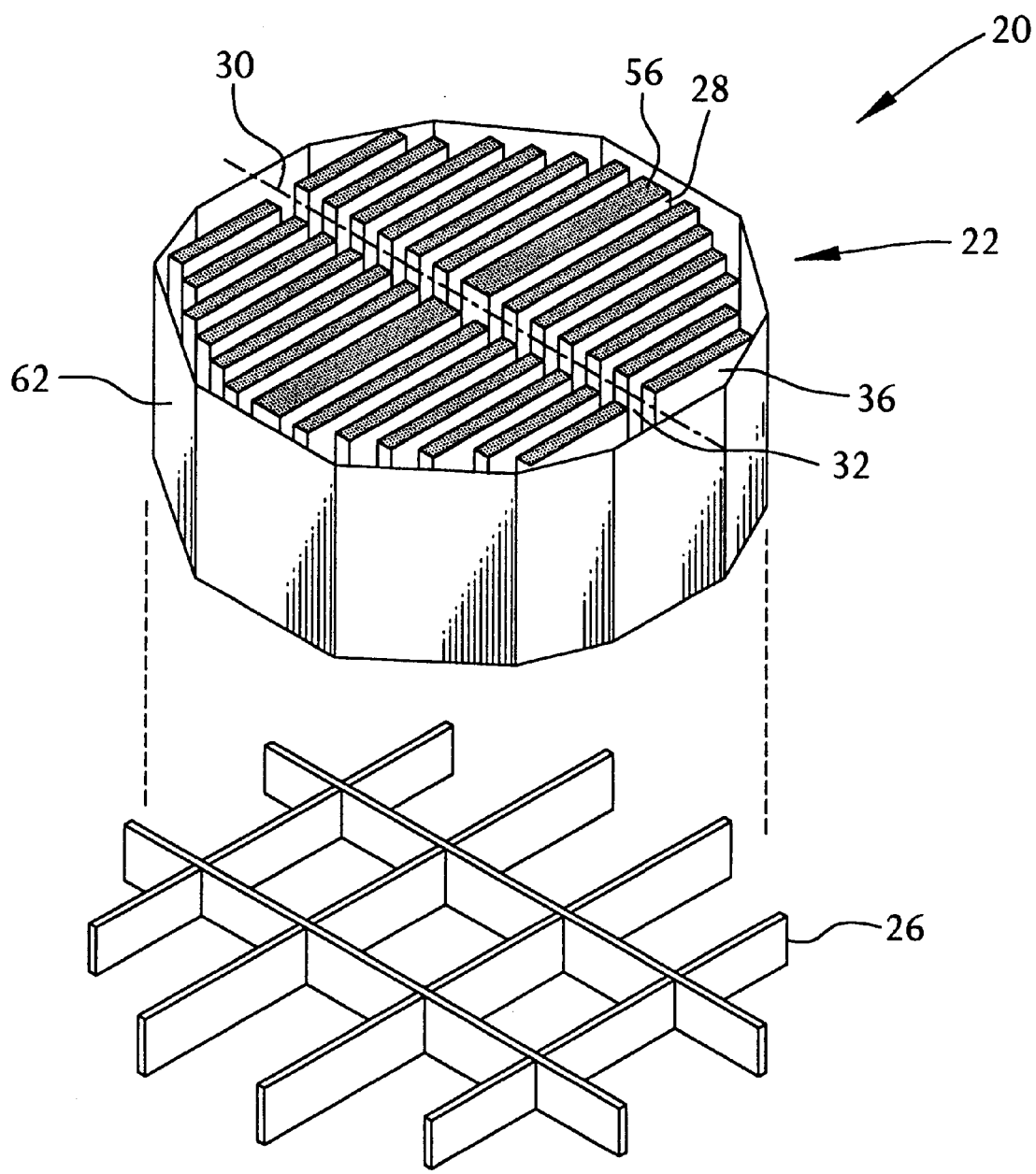
FIG. 1A is an exploded perspective view of another embodiment of the invention in which the vapor risers are capped by perforated plates (and there is no deck)

In an alternate embodiment, the distributor 22 may include liquid troughs 28 with vapor risers 36 that are capped by perforated plates 56 only, leaving the tops of the liquid-containing troughs open, as shown in FIG. 1A. This alternate embodiment has reduced capability to mix and filter liquids relative to the preferred embodiment. To further enhance mixing in the liquid phase, this alternate embodiment also can be fitted with canted flumes 54 (not shown in FIG. 1A) similar to those shown in FIGS. 3A and 3B. Since there is not a deck in the alternate embodiment, the supports 58 for the canted flumes may be attached to the distributor wall 62 or other structural parts of the distributor.

Combined Distributor With Vapor or Liquid Draw

Sidedraws may be introduced into the interior of the combined distributor 20 by penetrating the wall of a column with a draw nozzle at the same elevation in the column as the combined distributor, so that the draw nozzle also penetrates the wall of the distributor. The draw nozzle may be located wholly below the perforated deck 24 and above the bottom of the liquid-containing troughs 28. By locating the draw nozzle at the same elevation as the distributor 22, column height is minimized. The basic design features of the combined distributor without feeds or draws are retained, e.g., liquid troughs 28, perforated deck 24, and support grate 26. Also retained is the possibility of using canted flumes 54 to enhance liquid mixing.

Figure 4A:
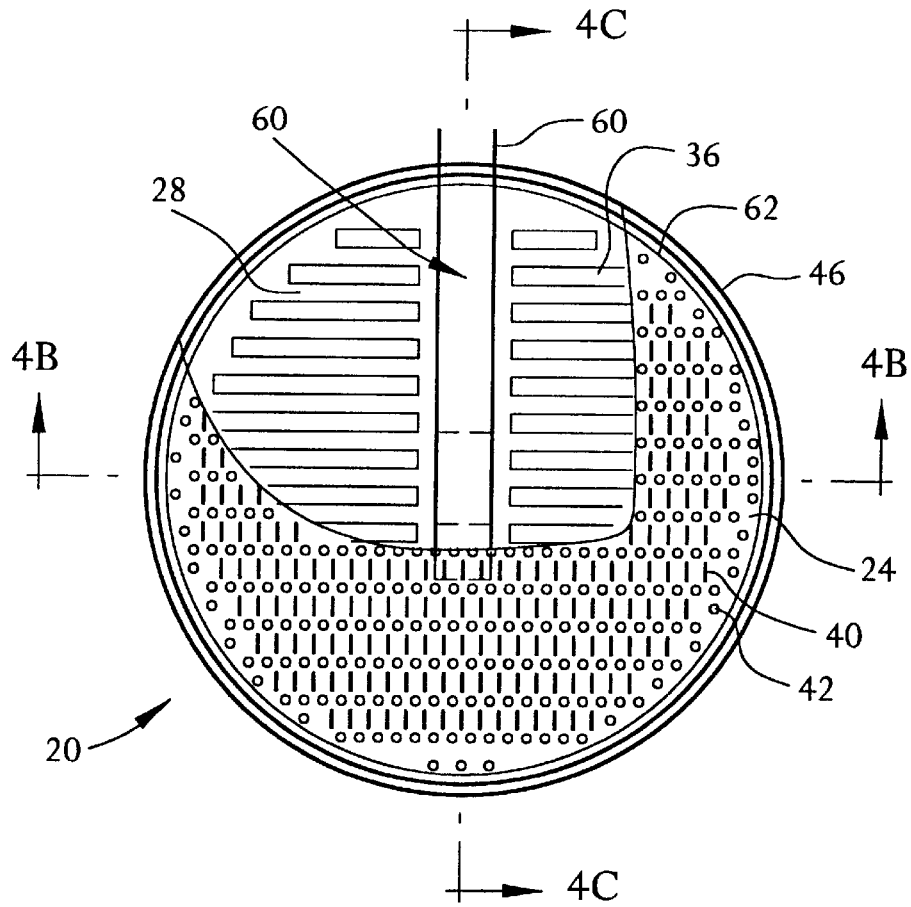
FIG. 4A is a top plan view, partially cut away, of another embodiment of the invention with a liquid sidedraw in a column.
Figure 4B:
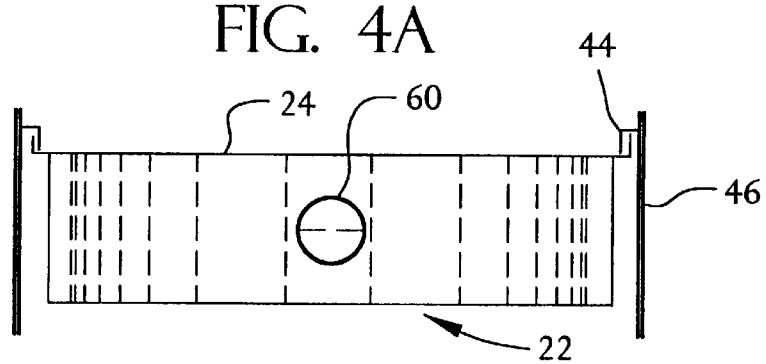
FIG. 4B is a side view of the embodiment of FIG. 4A taken along lines 4B—4B in FIG. 4A.
Figure 4C:
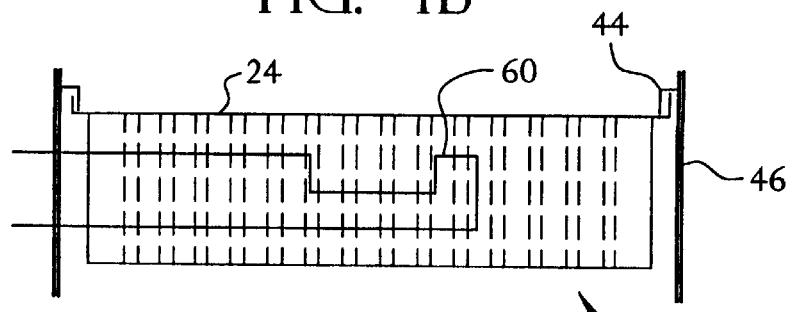
FIG. 4C is side view of the embodiment of FIG. 4A taken along lines 4C—4C in FIG. 4A.

An example of the combined distributor 20 with a liquid sidedraw is shown in FIGS. 4A, 4B and 4C. The liquid draw nozzle 60 penetrates the column wall 46 and the distributor wall 62, and occupies one of the channels in the distributor 22 from which the liquid-containing troughs 28 project perpendicularly. The nozzle may be any conventional type of liquid draw nozzle, including the upward-facing half-pipe cut-out nozzle shown in FIG. 4. The combined distributor in this embodiment is identical to that described above for each embodiment without draws or feeds, except for the presence of the wall penetration and the nozzle.

Figure 5A:
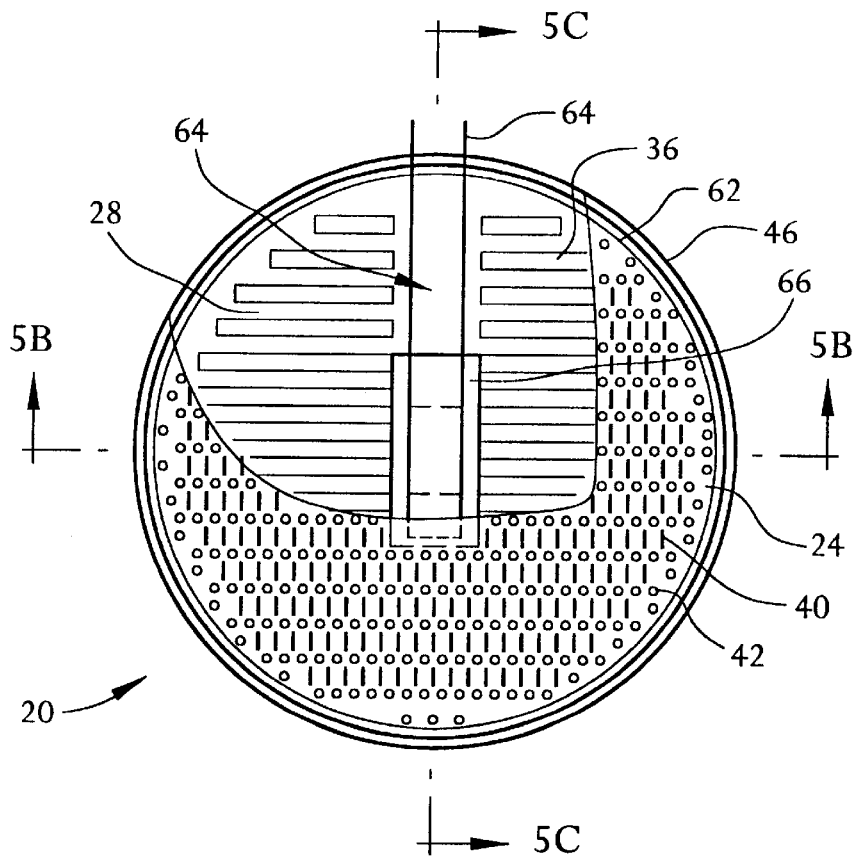
FIG. 5A is top plan view, partially cut away, of another embodiment of the invention with a vapor draw in a column.
Figure 5B:
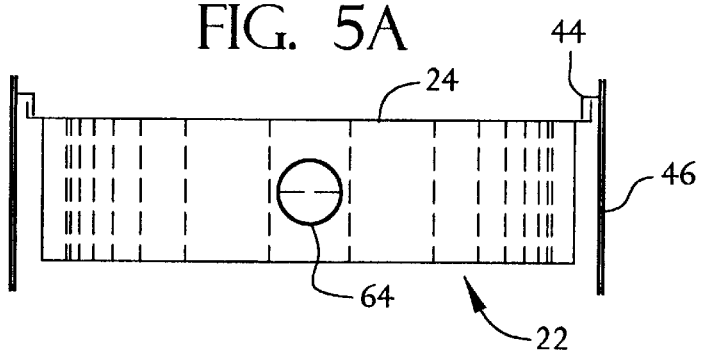
FIG. 5B is a side view taken along lines 5B—5B of the embodiment in FIG. 5A.
Figure 5C:
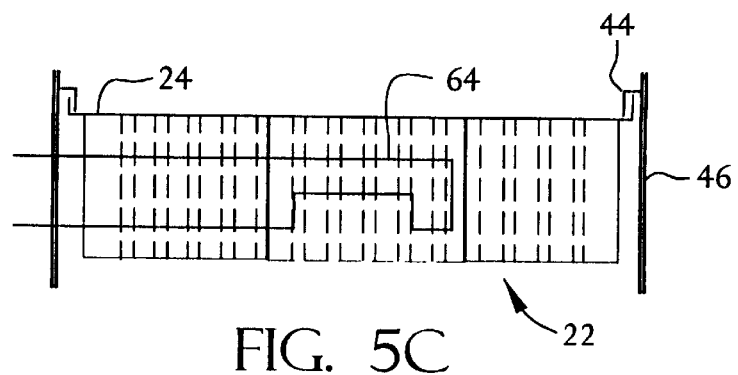
FIG. 5C is a side view taken along lines 5C—5C of the embodiment in FIG. 5A.

An example of the combined distributor 20 with vapor draw is shown in FIGS. 5A, 5B and 5C. The vapor draw nozzle 64 penetrates the column wall 46 and the distributor wall 62, and occupies one of the channels in the distributor 22 from which the liquid-containing troughs 28 project perpendicularly. The channel is interrupted near the center of the column by a wall through which the vapor draw nozzle passes. The central region is occupied only by the vapor draw nozzle, and is sealed from the liquid-containing channels and troughs on all sides. Vapor is only withdrawn in the central region; the vapor draw nozzle is submerged in the liquid in the channel and gutter at all other points. The perforated deck 24 is located over the vapor draw nozzle at all points along the length of the vapor draw nozzle, and the perforations 40 for vapor to pass upward through are absent in the "dry" area 66 directly above the vapor-offtake portion of the vapor draw nozzle 64. This is to avoid liquid weeping through those perforations which might be deficit in vapor flow because of a shadowing effect created by the vapor draw nozzle. The vapor draw nozzle can be any conventional type of vapor draw nozzle, including the downward-facing half-pipe cut-out nozzle shown in FIGS. 5A, 5B and 5C.

Combined Distributor with Vapor or Liquid Feed

As with combined distributors which contain a liquid or vapor draw, the configuration of the combined distributor 20 with liquid or vapor feed which occupies the least amount of column height is formed by penetrating the wall of the column with the feed nozzle at the same elevation in the column as the combined distributor.

Figure 6A:
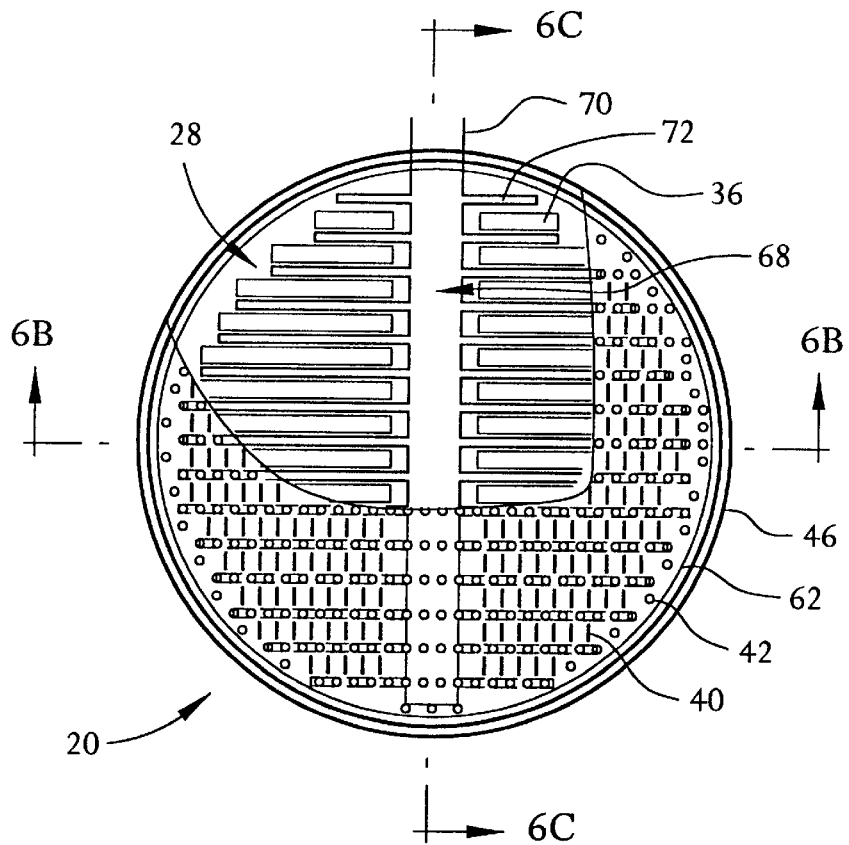
FIG. 6A is a top plan view, partially cut away, of another embodiment of the invention with a liquid feed in a column.
Figure 6B:
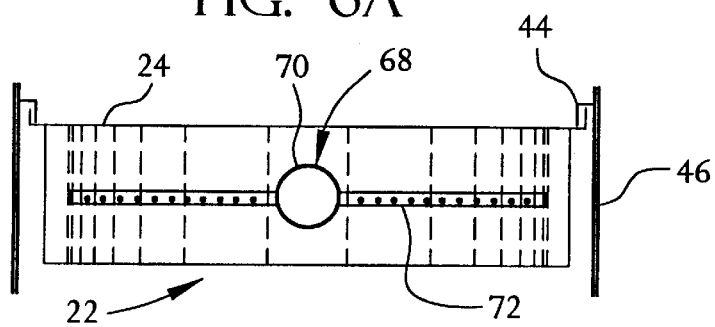
FIG. 6B is a side view taken along the lines 6B—6B of the embodiment in FIG. 6A.
Figure 6C:
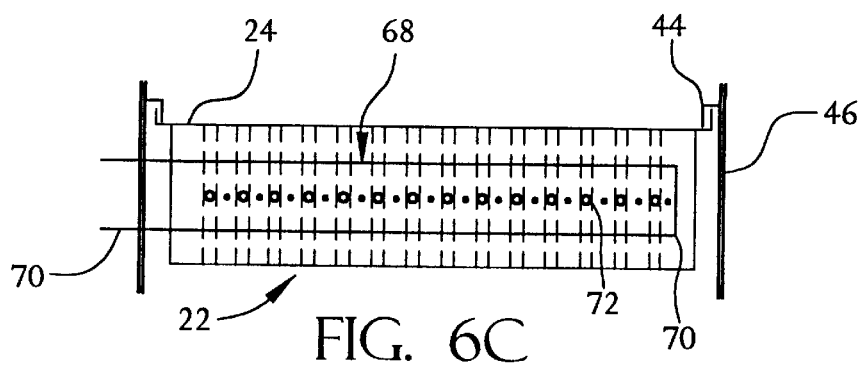
FIG. 6C is a side view taken along the lines 6C—6C of the embodiment in FIG. 6A.

An example of the combined distributor 20 with a liquid feed is shown in FIGS. 6A, 6B and 6C. The liquid feed nozzle 68 penetrates the side of the column and the distributor 22, and occupies one of the channels in the distributor from which the liquid-containing troughs 28 project perpendicularly. The nozzle may be any conventional type of liquid feed nozzle. Alternatively and preferably, the nozzle may comprise a central manifold 70 from which pipes 72 project outward perpendicularly, as shown in FIG. 6A. The central manifold lies within a liquid-containing channel in the combined distributor, while each of the projecting pipes lies within a liquid-containing trough 28. The pipes and central manifold are perforated in a horizontal plane, so that the liquid introduced to the combined distributor from the liquid feed nozzle is directed towards the walls of the liquid-containing channel and troughs. The combined distributor is identical to that described above for the embodiment without draws or feeds, except for the presence of the wall penetration and the liquid feed nozzle.

Figure 7A:
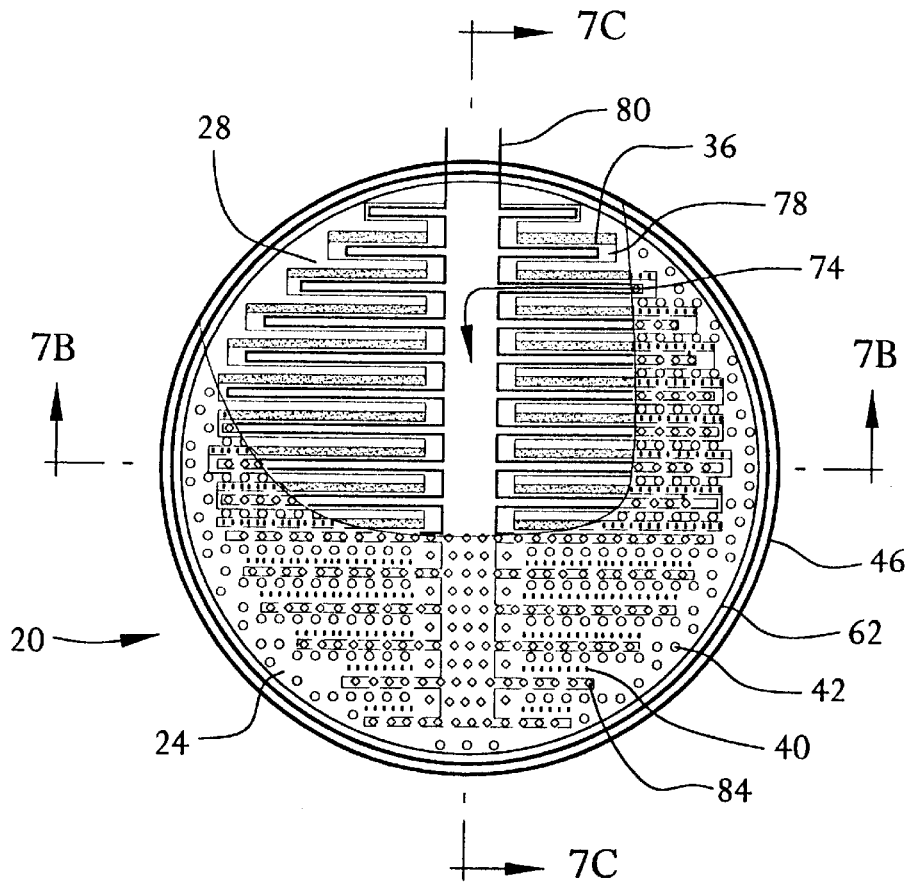
FIG. 7A is a top plan view, partially cut away, of another embodiment of the invention with a vapor feed in a column.
Figure 7B:
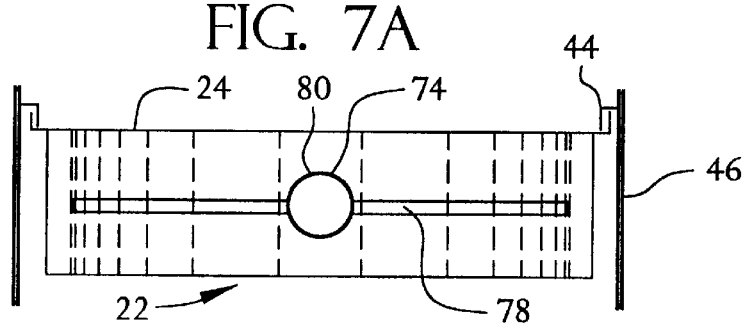
FIG. 7B is a side view taken along lines 7B—7B of the embodiment in FIG. 7A.
Figure 7C:
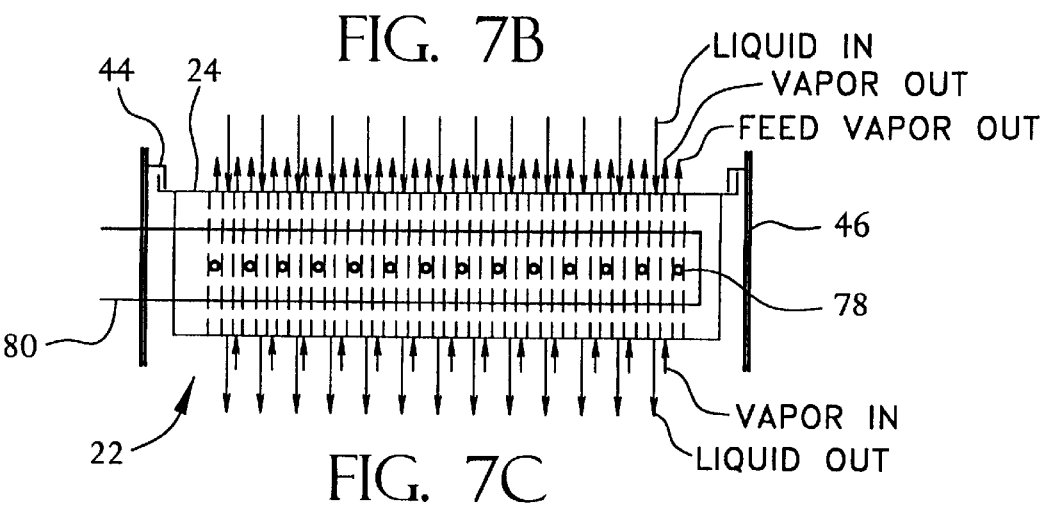
FIG. 7C is a side view taken along lines 7C—7C of the embodiment in FIG. 7A and includes directional arrows representing the directions of the flows of vapor, vapor feed, and liquid.

An example of the combined distributor 20 with a vapor feed is shown in FIGS. 7A, 7B and 7C. The vapor feed nozzle 74 penetrates the side of the column and the distributor 22, and a perforated deck 24 covers the vapor feed nozzle, the vapor risers 36, and the liquid troughs 28. In contrast to the combined distributors with vapor draw, liquid draw, or liquid feed described above, the vapor feed nozzle 74 does not occupy a liquid-containing trough or channel. Instead, a separate network of feed vapor passageways within the distributor 22 is provided to accept and distribute the feed vapor over the column cross-section. The network of feed vapor passageways is formed from a central vapor channel 80 and a series of smaller passageways 78 which project perpendicularly from the central vapor channel. The feed nozzle lies in the central vapor channel. No liquid enters the central vapor channel, nor does vapor from the packed section below the central vapor channel, which is sealed along the underside of the distributor to vapor flow, so that the only vapor which enters the central vapor channel comes from the vapor feed nozzle. The central vapor channel and projecting passageways lie adjacent to the liquid-containing troughs 28 and the vapor risers 36. Perforations 84 in the deck 24 allow the feed vapor to pass out of the network of passageways; additional perforations (40, 42) allow the vapor ascending from the vapor risers 36 to pass through the deck and descending liquid to pass through the deck into the liquid-containing troughs 28. The close proximity of the perforations 84 for the feed vapor and the perforations 40 for the vapor which ascends through the risers allows the two vapor streams to mix intimately above the perforated deck 24.

Figure 8:
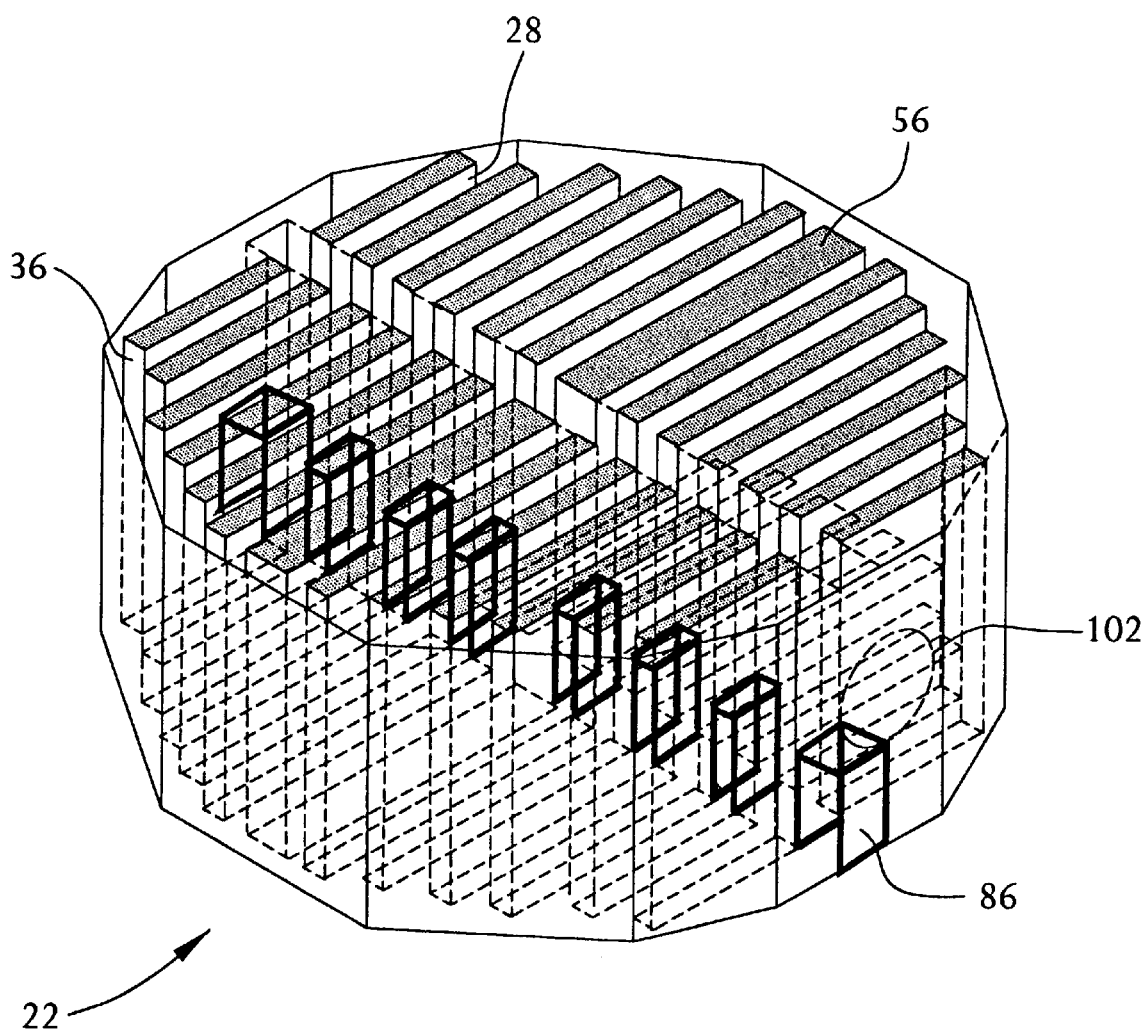
FIG. 8 is a perspective view of the distributor portion (i.e., deck and support grate not shown) of one embodiment of the invention illustrating the use of connecting ducts (heavy lines) located between troughs and in the gutter below a vapor feed nozzle (not shown) in an embodiment of the invention with vapor feed.

As described above and shown in FIGS. 7A, 7B and 7C, the liquid pathways in the liquid troughs 28 within the combined distributor 20 with vapor feed are interrupted by the central vapor channel 80. The liquid pathways are interrupted in the middle of the column and in the gutter. As a result, liquid level uniformity within the distributor 20 and the amount of column area directly irrigated by liquid are compromised. To achieve a more uniform liquid distribution in the packing below a combined distributor 20 with vapor feed, short, connecting ducts 86 can be used in the central vapor channel 80 between the liquid-containing troughs 28, as shown in FIG. 8. The connecting ducts lie on the floor of the distributor below the vapor feed nozzle 74, the exiting point 102 of which is show in FIG. 8 (which for purposes of illustration shows vapor risers 36 having perforated plates 56). The connecting ducts may be perforated on their undersides to irrigate the packing below.

Figure 9A:
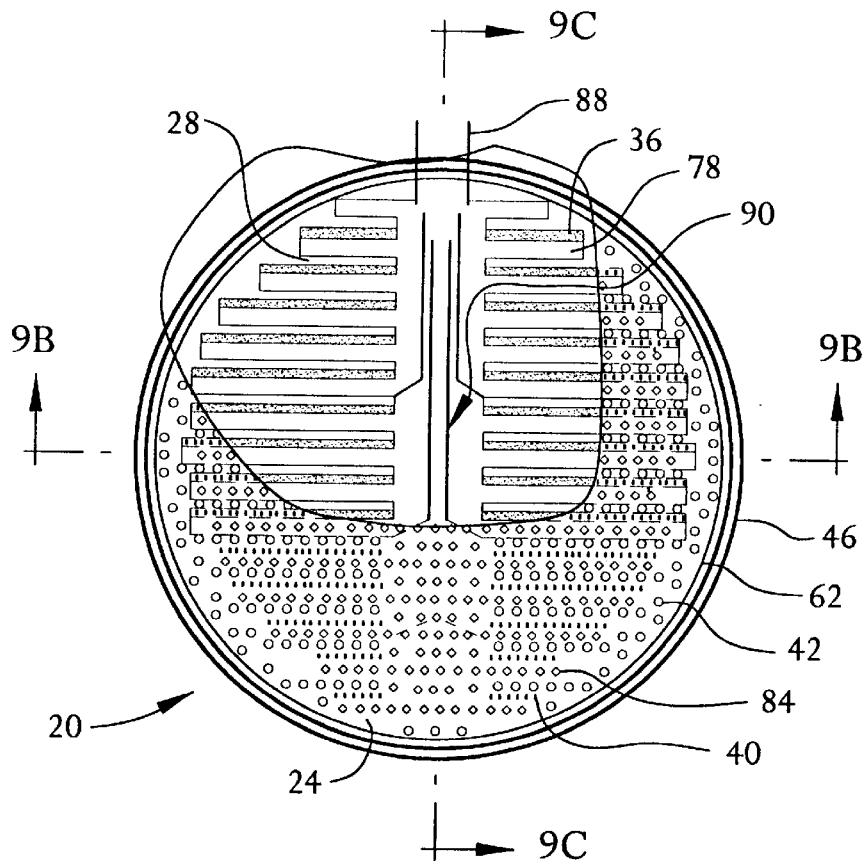
FIG. 9A is a top plan view of another embodiment of the invention, partially cut away to show a schematic of a truncated vapor feed nozzle and a system of baffles in the central vapor channel in a column.
Figure 9B:
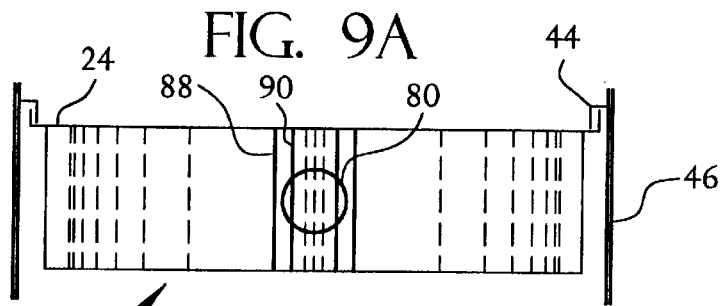
FIG. 9B is a side view taken along lines 9B—9B of the embodiment in FIG. 9A.
Figure 9C:
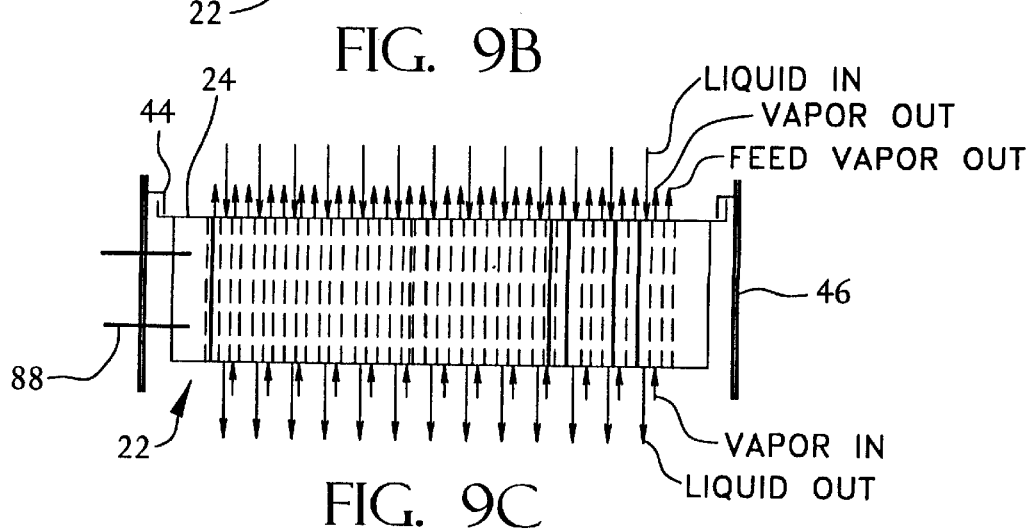
FIG. 9C is a side view taken along lines 9C—9C of the embodiment in FIG. 9A, and includes directional arrows representing the directions of the flows of vapor, vapor feed, and liquid.

The vapor feed nozzle may be any conventional vapor feed nozzle, including a perforated pipe or a beveled pipe, or it can be the type of vapor feed nozzle shown in FIGS. 7A, 7B and 7C which contains projecting pipes which lie in the vapor passageways. The vapor feed nozzle may be truncated within the gutter section of the combined distributor 20, so that the central vapor channel 80 acts as a feed nozzle. Baffles and other flow distribution devices may be located in the central vapor channel in this case to distribute the feed vapor uniformly to the feed vapor passageways 78 projecting perpendicularly from the central vapor channel 80. A schematic of a combined distributor 20 with a truncated vapor feed nozzle 88 and a system of vapor feed baffles 90 in the central vapor channel 80 is shown in FIGS. 9A, 9B, and 9C.

As described above, one example of a combined distributor 20 with vapor feed includes areas for liquid irrigation (the liquid troughs 28), areas for vapor ascending from the packing below (vapor risers 36), and areas to distribute the feed vapor (vapor passageways 78). An alternative to dividing the distributor into three types of areas is to divide the distributor into only two areas, one for liquid and one for vapor. To do this, the vapor feed nozzle having projecting pipes as described above and shown in FIGS. 7A, 7B and 7C could, instead of having the projecting pipes lie in a separate set of passageways, have the projecting pipes pierce the ends of vapor risers where they intersect the central channel. The projecting pipes could extend some distance into the riser area; alternatively, the projecting pipes could be absent, and only a hole in the ends of the risers adjacent to the central channel would allow the feed vapor to pass into the vapor risers. In either configuration, the feed vapor and the vapor ascending from the packing below would be mixed to some extent in the same vapor risers 36 before passing through the perforated deck 24. The need for separate passageways for feed vapor would be eliminated in this embodiment.

Combined Distributor With Two-Phase Feed

To handle two-phase feeds (liquid and vapor) a variation of the combined distributor 20 with liquid feed is proposed. The principle of locating the nozzle between the top and bottom of the combined distributor is retained.

Figure 10A:
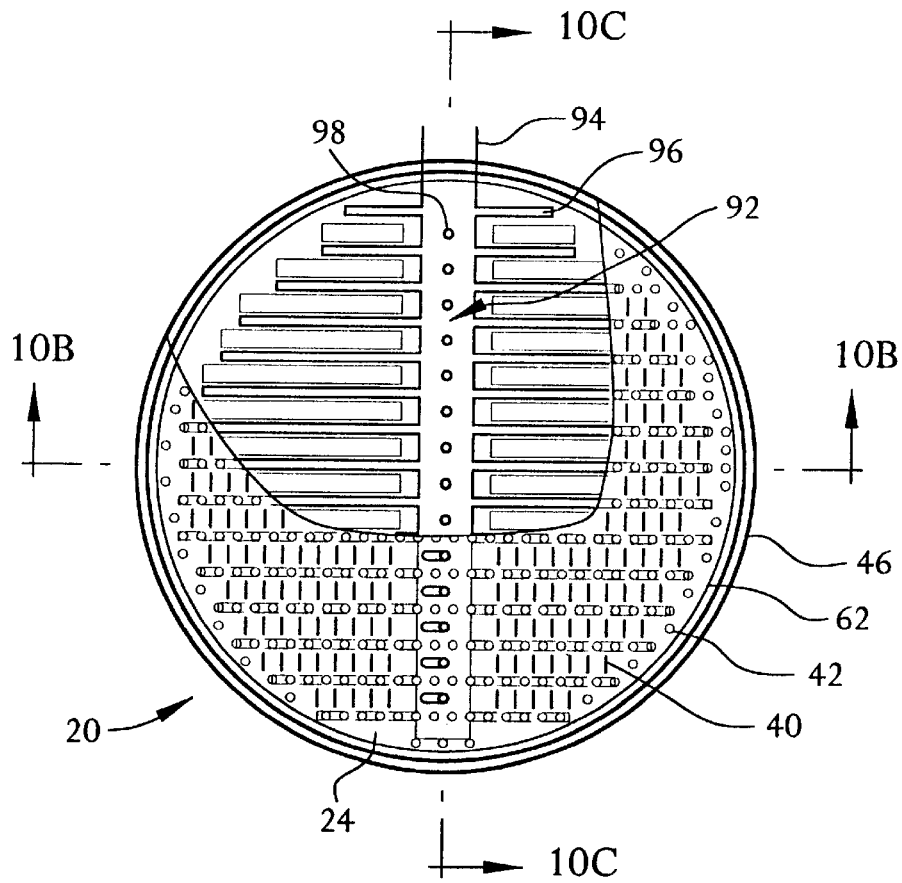
FIG. 10A is a top plan view, partially cut away, of another embodiment of the invention with two-phase feed (modest vapor fraction) in a column.
Figure 10B:
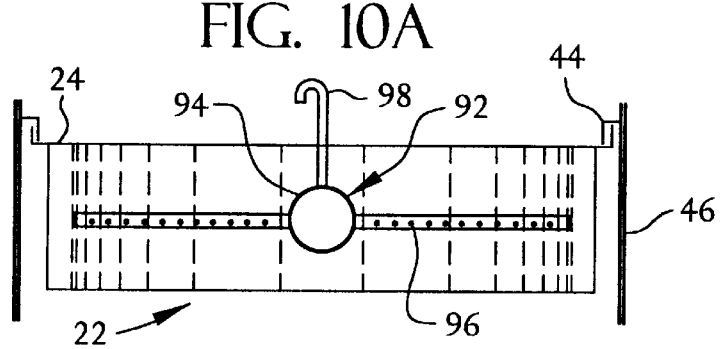
FIG. 10B is a side view taken along lines 10B—10B of the embodiment in FIG. 10A.
Figure 10C:
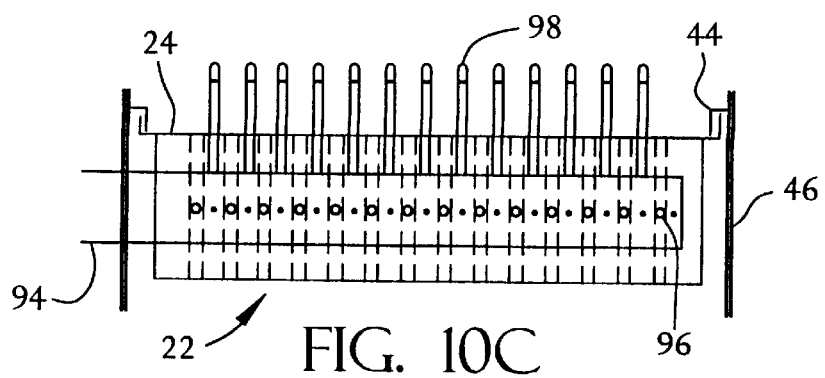
FIG. 10C is a side view taken along the lines 10C—10C of the embodiment in FIG. 10A.

An example of the combined distributor 20 with a two-phase feed is shown in FIGS. 10A, 10B and 10C. The two-phase feed nozzle 92 penetrates the side of the column and the distributor 22, and occupies the liquid-containing channels and troughs in the distributor. The two-phase feed nozzle consists of a central manifold 94 which occupies a liquid-containing channel. Preferably, pipes 96 project outward from the central manifold perpendicularly, as shown in FIG. 10A. Each of the projecting pipes lies within a liquid-containing trough 28. The two-phase feed nozzle should be sized so that stratified two-phase flow or stratified-wavy two-phase flow is developed within the central manifold. (Stratified two-phase flow occurs when the liquid occupies the lower portion of a horizontal pipe and the vapor occupies the top portion. Stratified-wavy two-phase flow is similar, except that traveling waves are formed on the top of the liquid as it moves with the vapor through the pipe or nozzle.) The pipes branch off from the central manifold below the liquid level, so that only liquid is carried into the troughs.

The vapor which disengages from the liquid in the central manifold 94 of the two-phase feed nozzle 92 is vented from the two-phase feed nozzle through vertically projecting tubes 98 (or pipes) which are located along the length of the upper side of the central manifold. The tubes penetrate the perforated deck 24 and terminate at a distance above the expected froth height on the deck. The tubes may terminate in a 180 degree bend or cap of some kind above the perforated deck to reduce the possibility that liquid will flow back into the two-phase feed nozzle from above. For two-phase feeds with relatively little vapor content, these tubes need only be located along the central manifold.

Figure 11A:
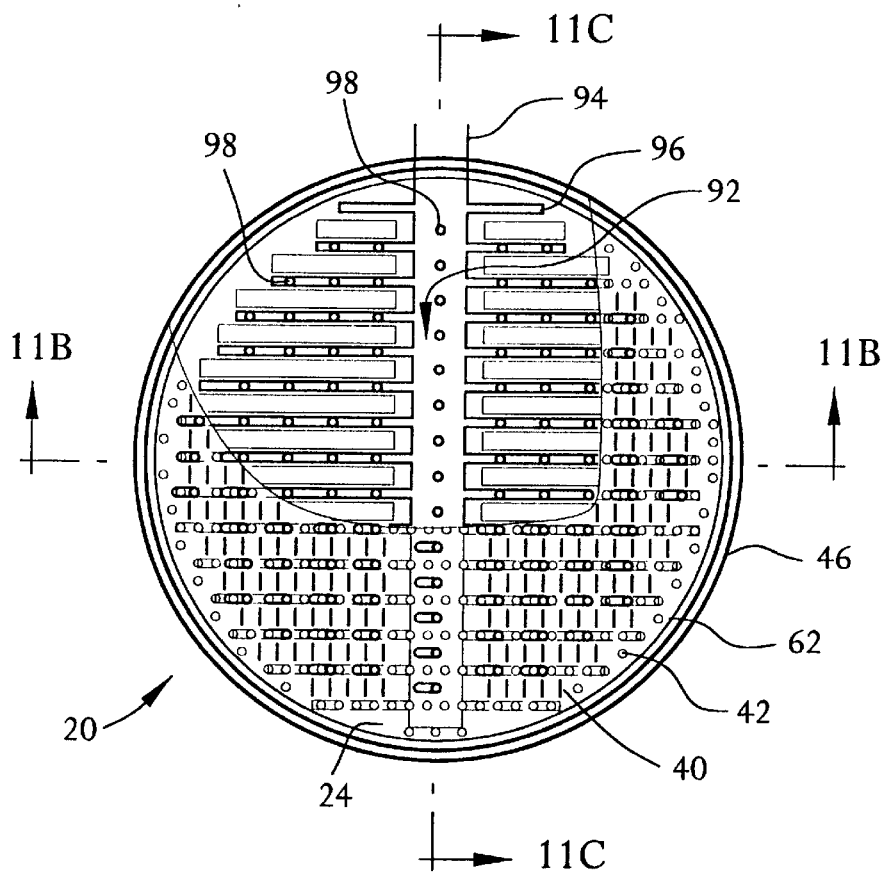
FIG. 11A is a top plan view, partially cut away, of another embodiment of the invention with two-phase feed (significant vapor fraction) in a column.
Figure 11B:
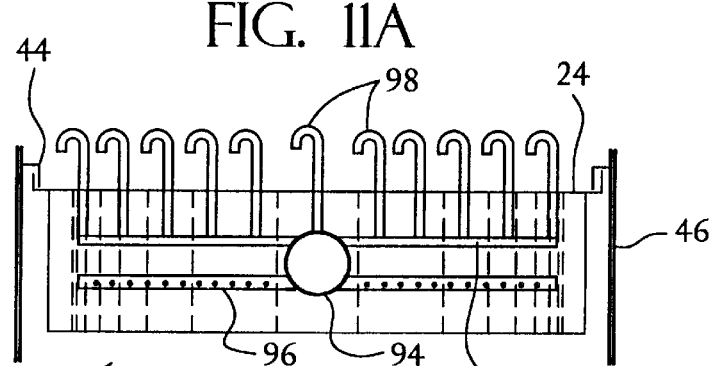
FIG. 11B is a side view taken along lines 11B—11B of the embodiment in FIG. 11A.
Figure 11C:
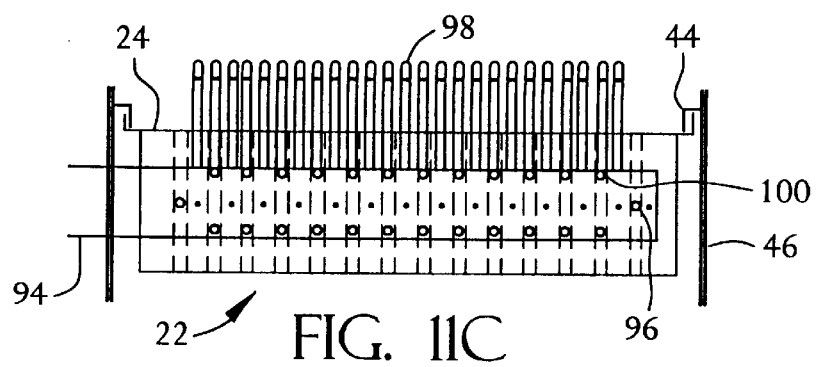
FIG. 11C is a side view taken along lines 11C—11C of the embodiment in FIG. 11A.

Alternatively, for two-phase feeds with a significant vapor content or for a vapor which has a significantly different composition from the prevailing vapor flow in the column at the feed point, a second set of pipes 100 which project perpendicularly from the central manifold 94 are used to carry vapor, as shown in FIGS. 11A, 11B and 11C. Each of the vapor-containing projecting pipes 100 is located in the liquid-containing troughs 28, and is fitted with a series of vertically projecting tubes 98 which penetrate the perforated deck 24 and carry the feed vapor out of the combined distributor 20. By adding tubes to a set of perpendicularly projecting pipes dedicated to vapor flow, the combined distributor can handle increased vapor feed flow and mixes the vapor feed more completely with the prevailing upward-flowing vapor in the column.

Combined Distributor With Multiple Feeds and/or Draws

Between some packed sections, simultaneous introduction and/or withdrawal of a multiplicity of vapor and/or liquid streams is required. According to the present invention, the required column height in-between packed sections can be reduced relative to conventional designs by placing multiple feeds and/or draws inside the combined distributor. The basic trough pattern of the combined distributors with multiple feeds and/or draws may differ from that of combined distributors with single feeds or draws to achieve acceptable quality of distribution and mixing.

Figure 12A:
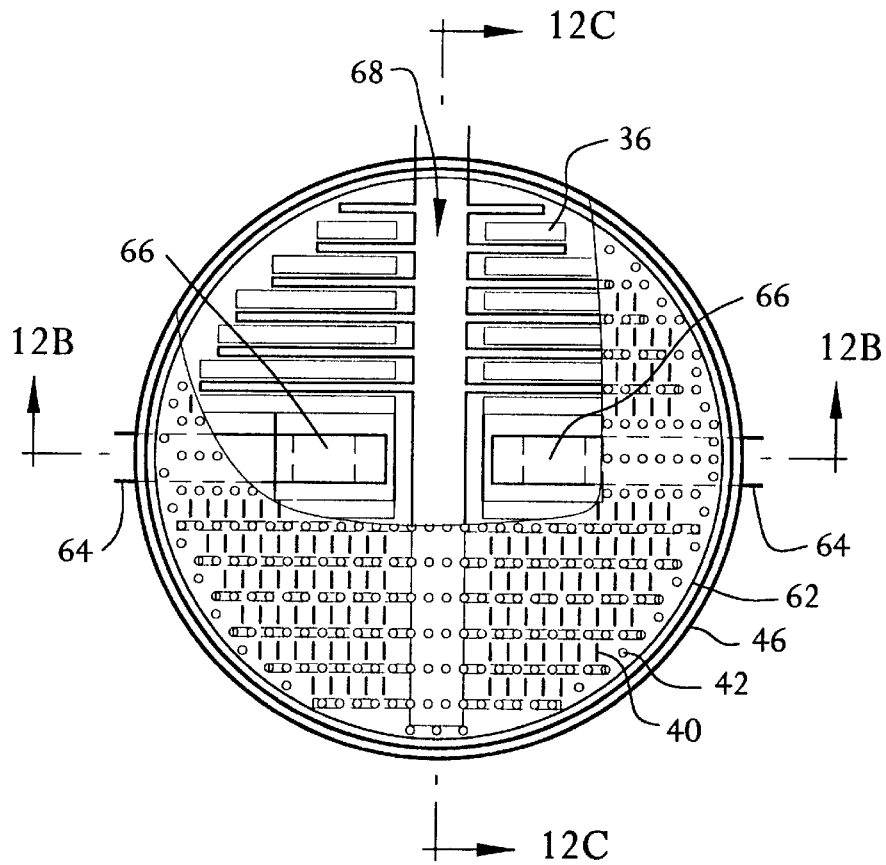
FIG. 12A is a top plan view, partially cut away, of another embodiment of the invention with a liquid feed and a vapor draw in a column.
Figure 12B:
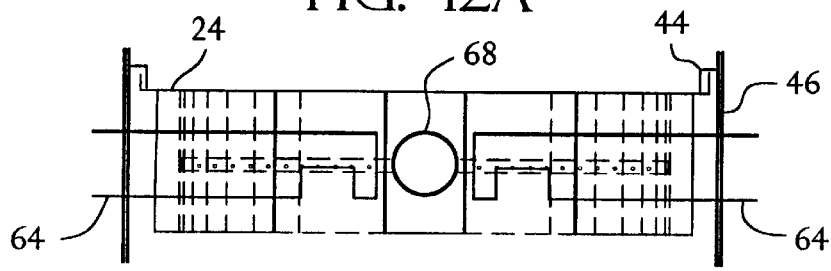
FIG. 12B is a side view taken along lines 12B—12B of the embodiment in FIG. 12A.
Figure 12C:
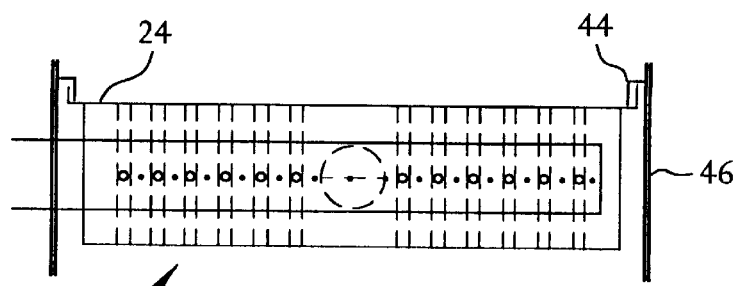
FIG. 12C is a side view taken along lines 12C—12C of the embodiment in FIG. 12A.

Many examples of combined distributors with multiple feeds and/or draws can be envisioned. One example, that of a combined distributor 20 with a liquid feed and a vapor draw is shown in FIGS. 12A, 12B and 12C. Here the basic trough layout has been altered to contain two perpendicular liquid-containing channels, rather than one or more parallel liquid-containing channels. The main channel houses the liquid feed nozzle 68 in a manner similar to that used for the combined distributor with liquid feed described above. The channel perpendicular to the main channel houses the vapor draw nozzles 64. Two vapor draw nozzles are used to collect vapor from two areas near the center of the column adjacent to and on either side of the main channel housing the liquid feed nozzle. The vapor draw nozzles penetrate the walls of the column and combined distributor and pass into the interior of the distributor 22 within the confines of a liquid-containing channel. The channel is interrupted near the center of the column by walls through which each nozzle passes. The walls partition off a region occupied only by the vapor draw nozzle, and sealed from the liquid-containing channels and troughs on all sides, similar to the embodiment described above for a single vapor draw nozzle. Vapor is only withdrawn in the partitioned regions; the draw nozzles are submerged in the liquid in the channel and gutter at all other points.

As in the previously described embodiments, a perforated deck 24 is located on top of the combined distributor 20 with multiple feeds and/or draws. Also retained is the possibility of using canted flumes 54 to enhance liquid mixing.

Combined Distributor With Conventional Feeds and/or Draws

The combined distributor concept can be used in conjunction with conventional feed and or draw nozzles located above or below the distributor. The most general embodiment includes a combined distributor 20 with multiple feeds and draws located above, within, and below the body of the distributor. The perforated deck can be perforated to a point up to and including 100% open area. The extreme is a situation without a perforated deck. Such a distributor may be useful when either vapor or liquid distribution is not considered important, or when a packed section does not exist either above or below the distributor. Such is the case at the top and bottom of a column—in the respective cases, the distributor acts as a liquid distributor and a vapor distributor only. The use of penetrating feed nozzles as described above is useful in reducing overall column height in these cases.

As discussed above, the prior art includes several patents (Canadian Patent No. 2,173,280, U.S. Pat. Nos. 5,132,055 and 5,224,351, and European Patent No. EP0644144A2) which disclose attempts at combining liquid and vapor distributors so that column height is minimized, while simultaneously promoting liquid mixing (but which make no specific provisions for mixing vapor). The present invention differs from the prior art in several ways.

First, the present invention utilizes a perforated deck 24 to bring the liquid and vapor phases into intimate contact. This contact has two benefits which cannot be achieved by the prior art: (1) the bubbling of the vapor through the liquid strongly mixes both phases, reducing any concentration gradients that may have developed across the column in either phase, and (2) the distillation that proceeds on the perforated deck acts as an additional mechanism to reduce cross-column concentration gradients.

The perforated deck 24 has another advantage over the prior art in that the combined distributor 20 is less susceptible to malperformance caused by gross liquid maldistribution in the packed section above. In the prior art designs, the troughs receive liquid directly from the packing above. Any non-uniformity in the received liquid flux must be dampened by hydrodynamic resistance of the orifices in the bottom of the troughs; dampening is accomplished primarily by decreasing the number and/or area of the orifices in the bottom of the troughs to increase the liquid level in the troughs, so that the liquid level variations in the troughs caused by flux non-uniformity are small relative to the total liquid head in the troughs. Increased liquid level requires increased trough height, which, in turn, requires increased column height. At very high levels of liquid maldistribution, the additional column height required to achieve a liquid level in the troughs adequate to dampen the flux nonuniformity becomes excessive. In contrast, the perforated deck 24 of the present invention imposes an added hydrodynamic resistance which allows the liquid enough residence time on the deck to mitigate liquid flux gradients through cross-column migration and mixing. Liquid migration and mixing on the deck is more efficient than migration and mixing in a trough distributor, because migration on the deck occurs in any direction in the plane of the deck, while migration in the trough distributor is mainly one dimensional. Thus, liquid maldistribution across the column will tend to be lessened before the liquid enters the troughs in the present invention. As a result, lower liquid levels are required in the troughs to achieve a uniform liquid presentation below the combined distributor and the height of the troughs may be reduced accordingly.

As discussed above, the present invention acts to mitigate the effects of liquid maldistribution by means of the perforated deck 24. In this context the perforated deck acts as a pre-distributor, and the trough-type distributor 22 below acts as the primary distributor. An intermediate trough was used as a pre-distributor in U.S. Pat. No. 5,240,652, as discussed above. The present invention has an advantage over that design in that the present invention performs both the liquid collection and pre-distribution functions at a single elevation within the column, whereas those functions are performed at two elevations in U.S. Pat. No. 5,240,652. The present invention also distributes vapor and makes provision for liquid and/or vapor feeds and/or draws, which U.S. Pat. No. 5,240,652 does not.

The proposed use of canted flumes 54 as an additional means of liquid mixing has an advantage over the internal baffles cited in the prior art. Internal baffles impose an added hydrodynamic resistance to liquid migration within the troughs, and therefore negatively affect the distribution when liquid maldistribution is present in the packed section above the combined distributor. In contrast, the canted flumes of the present invention are located on the perforated deck 24 where liquid migration and mixing is more efficient than in the troughs. Thus, the canted flumes pose less impediment to cross-column migration and mixing, and therefore affect the uniformity of the liquid distribution under the combined distributor less than the baffles in the prior art, especially under conditions when liquid maldistribution exists in the packing immediately above the combined distributor.

Finally, the present invention provides filtration capability. Filtration of the liquid may be important if small pieces of debris are present in the column, e.g., pieces of metal leftover from construction, small bits of structured packing, etc. Such debris, if not collected through filtration, may accumulate in the liquid distributor, blocking holes and potentially affecting the quality of the distribution. The combined distributor 20 effectively filters the liquid by accumulating debris on the perforated deck 24, rather than in the liquid-containing troughs 28. Because there can be many more individual perforations in the perforated deck relative to the number of perforations in the troughs, the overall distribution is minimally affected by the debris.

What is claimed is:

1. An apparatus for distributing a liquid and a vapor to or from a packing in an exchange column, comprising:
   a distributor, the distributor comprising:
      at least one vapor riser, the vapor riser having generally parallel spaced apart upright walls and an open top and an open bottom opposite the open top, and
      at least one liquid trough adjacent the vapor riser, the liquid trough having an open top and a floor having at least one aperture, the floor being opposite the open top of the liquid trough and attached to at least one wall of the adjacent vapor riser; and
   a deck having a top and a bottom above and adjacent the distributor, the deck having at least one aperture vertically aligned with the open top of the vapor riser and at least one aperture vertically aligned with the open top of the liquid trough.

2. An apparatus for distributing a liquid and a vapor to or from a packing as in claim 1, further comprising at least one canted flume above and adjacent the top of the deck, the canted flume adapted for directing the liquid from a packing onto the top of the deck.

3. An apparatus for distributing a liquid and a vapor to or from a packing as in claim 1, wherein the distributor is mounted on a support grate.

4. An apparatus for distributing a liquid and a vapor to or from a packing as in claim 1, further comprising a liquid draw nozzle disposed inside the distributor.

5. An apparatus for distributing a liquid and a vapor to or from a packing as in claim 1, further comprising a vapor draw nozzle disposed inside the distributor.

6. An apparatus for distributing a liquid and a vapor to or from a packing as in claim 1, further comprising a liquid feed nozzle disposed inside the distributor.

7. An apparatus for distributing a liquid and a vapor to or from a packing as in claim 1, further comprising a vapor feed nozzle disposed inside the distributor.

8. An apparatus for distributing a liquid and a vapor to or from a packing as in claim 7, further comprising at least one passageway adapted for transmitting a vapor feed from the vapor feed nozzle to the bottom of the deck, wherein the deck has at least one aperture in communication with the at least one passageway.

9. An apparatus for distributing a liquid and a vapor to or from a packing as in claim 7, further comprising at least one connecting duct disposed between adjacent liquid troughs below the vapor feed nozzle.

10. An apparatus for distributing a liquid and a vapor to or from a packing as in claim 7, further comprising at least one baffle disposed in the distributor, wherein the vapor feed nozzle is truncated.

11. An apparatus for distributing a liquid and a vapor to or from a packing as in claim 1, wherein a two-phase feed nozzle is disposed inside the distributor.

12. An apparatus for distributing a liquid and a vapor to or from a packing as in claim 11, wherein the two-phase feed nozzle comprises a central manifold and at least one projecting tube adapted for transmitting vented vapor from the central manifold, the projecting tube having one open end in communication with the central manifold and another open end above the top of the deck.

13. An apparatus for distributing a liquid and a vapor to or from a packing as in claim 12, further comprising:
   at least one pipe having an open end in communication with the central manifold, the pipe being adapted for transmitting vented vapor radially from the central manifold; and
   at least one projecting tube adapted for transmitting vented vapor from the pipe, the projecting tube having one open end in communication with the pipe and another open end above the top of the deck.

14. An apparatus for distributing a liquid and a vapor to or from a packing as in claim 1, further comprising a vapor draw nozzle disposed inside the distributor and a liquid feed nozzle disposed inside the distributor.

15. An apparatus for distributing a liquid and a vapor to or from a packing as in claim 1, wherein a total surface area of the apertures in the deck is in the range of essentially 0% to 100% of a total surface area of the deck.

16. An exchange column for exchanging heat and/or mass between a liquid and vapor, the exchange column having at least one apparatus for distributing the liquid and the vapor to or from a packing as in claim 1.

17. A process for cryogenic air separation comprising contacting vapor and liquid counter-currently in at least one distillation column containing at least one mass transfer zone, wherein liquid-vapor contact is established by at least one packing and wherein a liquid and a vapor are distributed to or from the packing by an apparatus for distributing a liquid and a vapor to or from a packing as in claim 1.

18. An apparatus for distributing a liquid and a vapor to or from a packing in an exchange column, comprising:
   at least one vapor riser, the vapor riser having generally parallel spaced apart upright walls and an open top and an open bottom opposite the open top, wherein at least one of the vapor risers has a perforated cap mounted on the top of the vapor riser; and
   at least one liquid trough adjacent the vapor riser, the liquid trough having an open top and a floor having at least one aperture, the floor being opposite the open top of the liquid trough and attached to at least one wall of the adjacent vapor riser.

19. An apparatus for distributing a liquid and a vapor to or from a packing as in claim 18, further comprising at least one canted flume above and adjacent the open top of the liquid trough, the canted flume adapted for directing the liquid from a packing to the open top of the liquid trough.

20. A method for assembling a combined liquid/vapor distributor for distributing a liquid and a vapor to or from a packing in an exchange column, comprising the steps of:
   providing the exchange column;
   providing a distributor, the distributor comprising:
      at least one vapor riser, the vapor riser having generally parallel spaced apart upright walls and an open top and an open bottom opposite the open top, and
      at least one liquid trough adjacent the vapor riser, the liquid trough having an open top and a floor having at least one aperture, the floor being opposite the open top of the liquid trough and attached to at least one wall of the adjacent vapor riser;
   providing a deck having a top and a bottom above and adjacent the distributor, the deck having at least one aperture vertically aligned with the open top of the vapor riser and at least one aperture vertically aligned with the open top of the liquid trough;
   installing the distributor in the exchange column; and
   installing the deck above and adjacent the distributor in the exchange column.

21. A method for assembling a combined liquid/vapor distributor for distributing a liquid and a vapor to or from a packing in an exchange column, comprising the steps of:
   providing the exchange column;
   providing a distributor, the distributor comprising:
      at least one vapor riser, the vapor riser having generally parallel spaced apart upright walls and an open top and an open bottom opposite the open top, and
      at least one liquid trough adjacent the vapor riser, the liquid trough having an open top and a floor having at least one aperture, the floor being opposite the open top of the liquid trough and attached to at least one wall of the adjacent vapor riser;
   providing at least one perforated cap;
   installing the distributor in the exchange column; and
   mounting the perforated cap on the top of at least one of the vapor risers.

22. A method for the collection and distribution of a liquid and a vapor in an exchange column, comprising the steps of:
   introducing the liquid into an upper portion of the exchange column;
   introducing the vapor into a lower portion of the exchange column;
   positioning within the exchange column at least two vertically spaced apart upper and lower mass or heat transfer sections to define a space in the column between the sections;
   positioning a combined distributor means to receive a downwardly flowing stream of liquid and an upwardly flowing stream of vapor in the space in the column, the combined distributor means comprising:
      a distributor, the distributor comprising:
         at least one vapor riser, the vapor riser having generally parallel spaced apart upright walls and an open top and an open bottom opposite the open top, and
         at least one liquid trough adjacent the vapor riser, the liquid trough having an open top and a floor having at least one aperture, the floor being opposite the open top of the liquid trough and attached to at least one wall of the adjacent vapor riser; and
      a deck having a top and a bottom above and adjacent the distributor, the deck having at least one aperture vertically aligned with the open top of the vapor riser and at least one aperture vertically aligned with the open top of the liquid trough;
   collecting the downwardly flowing stream of liquid from the upper portion of the column onto an upper surface of the top of the deck;
   passing the upwardly flowing stream of vapor from the lower portion of the column to the open bottom of each vapor riser;
   distributing the downwardly flowing stream of liquid from the at least one aperture in the floor of the liquid trough to the lower portion of the column; and
   distributing the upwardly flowing stream of vapor from the at least one aperture vertically aligned with the open top of each vapor riser to the upper portion of the column.

23. A method for the collection and distribution of a liquid and a vapor in an exchange column, comprising the steps of:
   introducing the liquid into an upper portion of the exchange column;

introducing the vapor into a lower portion of the exchange column;

positioning within the exchange column at least two vertically spaced apart upper and lower mass or heat transfer sections to define a space in the column between the sections;

positioning a combined distributor means to receive a downwardly flowing stream of liquid and an upwardly flowing stream of vapor in the space in the column, the combined distributor means comprising:

at least one vapor riser, the vapor riser having generally parallel spaced apart upright walls and an open top and an open bottom opposite the open top, wherein at least one of the vapor risers has a perforated cap mounted on the top of the vapor riser, and at least one liquid trough adjacent the vapor riser, the liquid trough having an open top and a floor having at least one aperture, the floor being opposite the open top of the liquid trough and attached to at least one wall of the adjacent vapor riser;

collecting the downwardly flowing stream of liquid from the upper portion of the column onto the perforated cap;

passing the upwardly flowing stream of vapor from the lower portion of the column to the open bottom of each vapor riser;

distributing the downwardly flowing stream of liquid from the at least one aperture in the floor of the liquid trough to the lower portion of the column; and distributing the upwardly flowing stream of vapor from the perforated cap to the upper portion of the column.

24. A method for assembling a combined liquid/vapor distributor for distributing a liquid and a vapor to or from a packing in an exchange column, comprising the steps of:

providing the exchange column;

providing a distributor, the distributor comprising:

at least one vapor riser, the vapor riser having generally parallel spaced apart upright walls and an open top and an open bottom opposite the open top, and at least one liquid trough adjacent the vapor riser, the liquid trough having an open top and a floor having at least one aperture, the floor being opposite the open top of the liquid trough and attached to at least one wall of the adjacent vapor riser;

providing a deck having a top and a bottom above and adjacent the distributor, the deck having at least one aperture vertically aligned with the open top of the vapor riser and at least one aperture vertically aligned with the open top of the liquid trough;

providing at least one canted flume adapted for directing the liquid from a packing onto the top of the deck;

installing the distributor in the exchange column;

installing the deck above and adjacent the distributor in the exchange column; and installing the at least one canted flume above and adjacent the top of the deck in the exchange column.

25. A method for assembling a combined liquid/vapor distributor for distributing a liquid and a vapor to or from a packing in an exchange column, comprising the steps of:

providing the exchange column;

providing a distributor, the distributor comprising:

at least one vapor riser, the vapor riser having generally parallel spaced apart upright walls and an open top and an open bottom opposite the open top, and at least one liquid trough adjacent the vapor riser, the liquid trough having an open top and a floor having at least one aperture, the floor being opposite the open top of the liquid trough and attached to at least one wall of the adjacent vapor riser;

providing at least one perforated cap;

providing at least one canted flume adapted for directing the liquid from a packing to the open top of the liquid trough;

installing the distributor in the exchange column;

mounting the perforated cap on the top of at least one of vapor risers; and installing the at least one canted flume above and adjacent the open top of the liquid trough.

26. A method for the collection and distribution of a liquid and a vapor in an exchange column, comprising the steps of:

introducing the liquid into an upper portion of the exchange column;

introducing the vapor into a lower portion of the exchange column;

positioning within the exchange column at least two vertically spaced apart upper and lower mass or heat transfer sections to define a space in the column between the sections;

positioning a combined distributor means to receive a downwardly flowing stream of liquid and an upwardly flowing stream of vapor in the space in the column, the to combined distributor means comprising:

a distributor, the distributor comprising:

at least one vapor riser, the vapor riser having generally parallel spaced apart upright walls and an open top and an open bottom opposite the open top, and at least one liquid trough adjacent the vapor riser, the liquid trough having an open top and a floor having at least one aperture, the floor being opposite the open top of the liquid trough and attached to at least one wall of the adjacent vapor riser;

a deck having a top and a bottom above and adjacent the distributor, the deck having at least one aperture vertically aligned with the open top of the vapor riser and at least one aperture vertically aligned with the open top of the liquid trough; and at least one canted flume above and adjacent the top of the deck, the canted flume adapted for directing the liquid from a packing onto the top of the deck;

collecting the downwardly flowing stream of liquid from the upper portion of the column onto the at least one canted flume;

passing the upwardly flowing stream of vapor from the lower portion of the column to the open bottom of each vapor riser;

distributing the downwardly flowing stream of liquid from the at least one aperture in the floor of the liquid trough to the lower portion of the column; and distributing the upwardly flowing stream of vapor from the least one aperture vertically aligned with the open top of each vapor riser to the upper portion of the column.

27. A method for the collection and distribution of a liquid and a vapor in an exchange column, comprising the steps of:

introducing the liquid into an upper portion of the exchange column;

introducing the vapor into a lower portion of the exchange column;

positioning within the exchange column at least two vertically spaced apart upper and lower mass or heat transfer sections to define a space in the column between the sections;

positioning a combined distributor means to receive a downwardly flowing stream of liquid and an upwardly flowing stream of vapor in the space in the column, the combined distributor means comprising:

at least one vapor riser, the vapor riser having generally parallel spaced apart upright walls and an open top and an open bottom opposite the open top, wherein at least one of the vapor risers has a perforated cap mounted on the top of the vapor riser, at least one liquid trough adjacent the vapor riser, the liquid trough having an open top and a floor having at least one aperture, the floor being opposite the open top of the liquid trough and attached to at least one wall of the adjacent vapor riser, and at least one canted flume above and adjacent the open top of the liquid trough, the canted flume adapted for directing the liquid from a packing to the open top of the liquid trough;

collecting the downwardly flowing stream of liquid from the upper potion of the column onto the at least one canted flume;

passing the upwardly flowing stream of vapor from the lower portion of the column to the open bottom of each vapor riser;

distributing the downwardly flowing stream of liquid from the at least one aperture in the floor of the liquid trough to the lower portion of the column; and distributing the upwardly flowing stream of vapor from the perforated cap to the upper portion of the column.

* * * * *

UNITED STATES PATENT AND TRADEMARK OFFICE
CERTIFICATE OF CORRECTION

PATENT NO. : 6,086,055            Page 1 of 1
DATED : July 11, 2000
INVENTOR(S) : Armstrong et al.

It is certified that error appears in the above-identified patent and that said Letters Patent is hereby corrected as shown below:

Column 22,
Line 28, delete "to"

Signed and Sealed this

Fourteenth Day of August, 2001

Attest:

NICHOLAS P. GODICI
*Attesting Officer*      *Acting Director of the United States Patent and Trademark Office*